United States Patent
Zhou et al.

(10) Patent No.: US 12,251,802 B2
(45) Date of Patent: Mar. 18, 2025

(54) VARIABLE FORCE PRESS TOOL SYSTEM

(71) Applicant: Ridge Tool Company, Elyria, OH (US)

(72) Inventors: Qi Zhou, Shanghai (CN); Egbert Frenken, Heinsberg (DE); Brendon Goede, Avon, OH (US); Harald Krondorfer, Aurora, OH (US)

(73) Assignee: Ridge Tool Company, Elyria, OH (US)

( * ) Notice: Subject to any disclaimer, the term of this patent is extended or adjusted under 35 U.S.C. 154(b) by 786 days.

(21) Appl. No.: 17/218,337

(22) Filed: Mar. 31, 2021

(65) Prior Publication Data

US 2022/0288754 A1    Sep. 15, 2022

(30) Foreign Application Priority Data

Mar. 11, 2021  (CN) .......................... 202110267146.2

(51) Int. Cl.
| | |
|---|---|
| *B25B 27/02* | (2006.01) |
| *B21D 39/04* | (2006.01) |
| *B23Q 17/09* | (2006.01) |
| *B25B 27/10* | (2006.01) |
| *B25B 28/00* | (2006.01) |

(52) U.S. Cl.
CPC .......... *B25B 27/026* (2013.01); *B21D 39/048* (2013.01); *B23Q 17/0995* (2013.01); *B25B 27/10* (2013.01); *B25B 28/00* (2013.01)

(58) Field of Classification Search
CPC ....... B25B 27/026; B25B 27/10; B25B 28/00; B21D 39/048; B23Q 17/0995; B25F 5/00
See application file for complete search history.

(56) References Cited

U.S. PATENT DOCUMENTS

| | | | |
|---|---|---|---|
| 5,309,751 A | 5/1994 | Ryan | |
| 6,202,290 B1 | 3/2001 | Kewitz et al. | |
| 7,146,839 B2 | 12/2006 | Goop | |
| 7,188,508 B2 | 3/2007 | Bowles et al. | |
| 7,260,975 B2 | 8/2007 | Hamm et al. | |
| 7,421,871 B2 | 9/2008 | Goop | |
| 7,578,159 B2 | 8/2009 | Bowles et al. | |
| 8,549,656 B2 | 10/2013 | Blaisdell et al. | |
| 9,873,187 B2 | 1/2018 | Bungter et al. | |
| 10,427,201 B2 | 10/2019 | Bungter et al. | |
| 10,513,015 B2 | 12/2019 | Lefavour et al. | |
| 2002/0148274 A1 | 10/2002 | Goop et al. | |
| 2007/0097566 A1* | 5/2007 | Woods | B24B 23/028 361/33 |

(Continued)

FOREIGN PATENT DOCUMENTS

| | | |
|---|---|---|
| CN | 101184585 A | 5/2008 |
| CN | 104973070 A | 10/2015 |

(Continued)

OTHER PUBLICATIONS

Examination Report dated Feb. 22, 2022; Application DE 10 2021 204 604.5; 12 pages.

(Continued)

*Primary Examiner* — Tung S Lau
(74) *Attorney, Agent, or Firm* — Erik J. Overberger; RANKIN, HILL & CLARK LLP

(57) ABSTRACT

Pressing tools and jaws are described which include communication provisions that enable information concerning the jaws to be used with the press tool, to be transmitted to the tool. The press tool includes provisions that limit or otherwise tailor the output of the tool based on information concerning the jaws.

31 Claims, 18 Drawing Sheets

(56) References Cited

U.S. PATENT DOCUMENTS

| | | |
|---|---|---|
| 2007/0214859 A1 | 9/2007 | Bowles et al. |
| 2008/0216543 A1 | 9/2008 | Bowles et al. |
| 2009/0040061 A1* | 2/2009 | Golunski ............... G07C 3/08 377/16 |
| 2009/0293577 A1 | 12/2009 | Hamm |
| 2010/0253066 A1 | 10/2010 | Cygler, III et al. |
| 2011/0153868 A1 | 6/2011 | Castleberry et al. |
| 2012/0060165 A1 | 3/2012 | Clarke et al. |
| 2013/0122861 A1 | 5/2013 | Kim et al. |
| 2014/0107853 A1* | 4/2014 | Ashinghurst ......... G05B 15/02 700/297 |
| 2015/0292465 A1* | 10/2015 | Wright ................ F02N 11/108 903/905 |
| 2018/0161969 A1 | 6/2018 | Rosani |
| 2020/0127429 A1 | 4/2020 | Ruch et al. |
| 2020/0133229 A1* | 4/2020 | Girt ........................ B25F 5/00 |
| 2020/0141425 A1 | 5/2020 | Ruch et al. |
| 2020/0238487 A1 | 7/2020 | Kanack et al. |

FOREIGN PATENT DOCUMENTS

| | | | |
|---|---|---|---|
| CN | 107921522 A * | 4/2018 | ......... B25B 23/1456 |
| DE | 19946380 | 4/2000 | |
| DE | 10016752 | 10/2001 | |
| DE | 10354166 | 6/2005 | |
| DE | 102007035206 | 1/2009 | |
| DE | 102010049946 B4 | 4/2013 | |
| DE | 102013203553 | 7/2014 | |
| DE | 202015009853 | 10/2020 | |
| DE | 102020115060 | 12/2021 | |
| EP | 0860222 B1 | 11/2001 | |
| EP | 0860223 B1 | 12/2001 | |
| EP | 0860220 B1 | 2/2003 | |
| WO | WO2012/155937 | 11/2012 | |
| WO | WO2013/119247 | 8/2013 | |
| WO | WO2013/141868 A | 9/2013 | |
| WO | WO2013/163249 | 10/2013 | |
| WO | WO2020/069531 | 4/2020 | |

OTHER PUBLICATIONS

Baumer catalog; Inductive Sensors; www.baumer.com; 230 pages.
Novopress product, ECO301 Product Manual 2012; 40530/b09int; 162 pages.
China—Office Action and search report dated Nov. 29, 2024; Application No. CN202110267146.2; 6 pages.

* cited by examiner

VARIABLE FORCE PRESS TOOL SYSTEM

FIELD

The present subject matter relates to press tools, systems, and/or components associated with press tools, and methods involving press tools and related components.

BACKGROUND

At present, many commercially available pressing tools have only a single output force, for example 32 kN, 24 kN or 18 kN tools. In contrast, fittings of different sizes require different forces for sufficient deformation during pressing. For example, fittings smaller than 1 inch require about 18 kN output force, 1¼ inch fittings require about 24 kN output force, and 2 inch fittings require about 32 kN output force.

If a single tool such as a tool that provides an output force of 32 kN is used to press fittings of all sizes, a significant amount of energy will be wasted. This can be problematic, especially for battery-powered tools. Also, the high output force will require all jaws regardless of their size, to exhibit sufficient material properties and/or hardness. For example, a 32 kN tool can only use standard jaws, which are relatively large and formed of relatively strong material. Thus, a 32 kN tool is precluded from using compact jaws, which are smaller and may be formed of lower strength material.

In addition, marketing research shows that typical purchasers of pressing tools prefer large capacity pressing tools, for example 32 kN tools for use with fittings up to 2 inches. However, most pressing applications involve fittings having a size of 1 inch or less.

Accordingly, a need exists for a pressing tool or tool system which addresses these issues.

SUMMARY

The difficulties and drawbacks associated with previous approaches are addressed in the present subject matter as follows.

In one aspect, the present subject matter provides a jaw assembly comprising a first jaw arm member, and a second jaw arm member. Each of the first and the second jaw arm members define a front end and a rear end, and inwardly facing cam surfaces at the rear ends. The jaw assembly further comprises a pair of side plates between which the first and the second jaw arm members are pivotally retained. And, the jaw assembly comprises an electronic chip incorporated into the jaw assembly for identifying and/or providing information relating to the jaw assembly.

In another aspect, the present subject matter provides a press tool comprising a motor actuated by a displaceable trigger. The press tool also comprises a hydraulic circuit including a pump, a reservoir, a hydraulic cylinder, and a piston movably disposed in the cylinder. Upon actuation of the motor, the pump is operated to thereby move the piston relative to the cylinder. The press tool also comprises a displaceable ram assembly in operable engagement with the piston. The press tool also comprises engagement provisions for releasably engaging a jaw assembly with the press tool. And, the press tool comprises communication provisions for receiving information associated with a jaw assembly to be used with the press tool.

In yet another aspect, the present subject matter also provides a tool system comprising at least one cloud server, and at least one tool including interconnectivity provisions for communicating with the at least one cloud server. The tool system also comprises at least one tool accessory configured for use with the at least one tool. The tool accessory includes an electronic chip incorporated into the tool accessory for identifying and/or providing information relating to the tool accessory. At least one tool also includes communication provisions for receiving information from the chip incorporated into the tool accessory.

In still another aspect, the present subject matter provides a method of using a jaw assembly and a press tool. The method comprises providing a jaw assembly including an electronic chip incorporated into the jaw assembly for identifying and/or providing information relating to the jaw assembly. The method also comprises providing a press tool including a hydraulic circuit, a pressure sensor for monitoring the pressure in the hydraulic circuit, a motor, and communication provisions for receiving information associated with the jaw assembly. The method also comprises engaging the jaw assembly with the press tool. The method further comprises initiating operation of the press tool. The method also comprises receiving information relating to the jaw assembly by the press tool. The method additionally comprises using the received information. The press tool then determines an appropriate set pressure target of the hydraulic circuit. The method also comprises activating the motor of the press tool. The method further comprises monitoring the pressure in the hydraulic circuit by the pressure sensor in the press tool. Upon the monitored pressure in the hydraulic circuit equaling or exceeding the set pressure target, the method then performs at least one of (i) releasing pressure in the hydraulic circuit, and (ii) terminating operation of the motor.

In still a further aspect, the present subject matter provides a method of managing a system of at least one tool and at least one tool accessory. The method comprises counting use cycles of the at least one tool to provide a first cumulative total. The method also comprises counting use cycles of at least one tool accessory to provide a second cumulative total. The method also comprises comparing the first cumulative total to a tool use warning value. The method further comprises comparing the second cumulative total to a tool accessory warning value. If the first cumulative total is greater than the tool use warning value, or if the second cumulative total is greater than the tool accessory warning value; a warning signal is issued by the at least one tool.

In yet another aspect, the present subject matter provides a jaw assembly comprising a first jaw arm member, and a second jaw arm member. Each of the first and the second jaw arm members define a front end and a rear end, and inwardly facing cam surfaces at the rear ends. The jaw assembly further comprises a pair of side plates between which the first and the second jaw arm members are pivotally retained. At least one of the side plates includes a physical feature for providing information concerning the jaw assembly.

In another aspect, the present subject matter provides a jaw assembly comprising a first jaw arm member, and a second jaw arm member. Each of the first and the second jaw arm members define a front end and a rear end, and inwardly facing cam surfaces at the rear ends. At least one of the first and second jaw arm members includes a physical feature for providing information concerning the jaw assembly.

In still another aspect, the present subject matter provides a press tool comprising a motor actuated by a displaceable trigger. The press tool also comprises a hydraulic circuit including a pump, a reservoir, a hydraulic cylinder, and a piston movably disposed in the cylinder. Upon actuation of the motor, the pump is operated to thereby move the piston relative to the cylinder. The press tool also comprises a displaceable ram assembly in operable engagement with the piston. The press tool additionally comprises engagement provisions for releasably engaging a jaw assembly with the press tool. And, the press tool also comprises a sensing assembly for receiving information associated with a jaw assembly to be used with the press tool.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

As press tools have evolved, they have become more light weight and compact in size. The only component of press tools that has not significantly changed is the press jaw or jaw assembly. In one aspect, the present subject matter allows designers to optimize smaller press jaws adapted for actual application requirements, for example, use with a particular fitting size or range of fitting sizes. This will lead to significant reductions in the weight of the jaws, reductions in the material requirements of the jaws, and/or to significant improvements in the cycle life of the jaws.

In accordance with another aspect of the present subject matter, press jaws and press tools are provided with communication provisions that enable information regarding the jaws to be used and engaged with the press tool, to be transmitted or otherwise provided to the press tool. The press tool includes communication provisions that receive the information from the jaws and may optionally further include information processing provisions to analyze and/or monitor information transmitted or provided by the jaws. In many embodiments, the press tool also includes provisions that limit or otherwise control the force output of the press tool based on the jaws and more particularly the information transmitted or provided by the jaws.

In certain embodiments of the present subject matter, a user can be alerted of necessary service, or a jaw approaching the end of its useful life span. This allows the user to prepare accordingly and to improve uptime on the jobsite. These aspects can potentially be combined with the aspects of tool wireless connectivity. These and other aspects are described herein.

Figure 1:
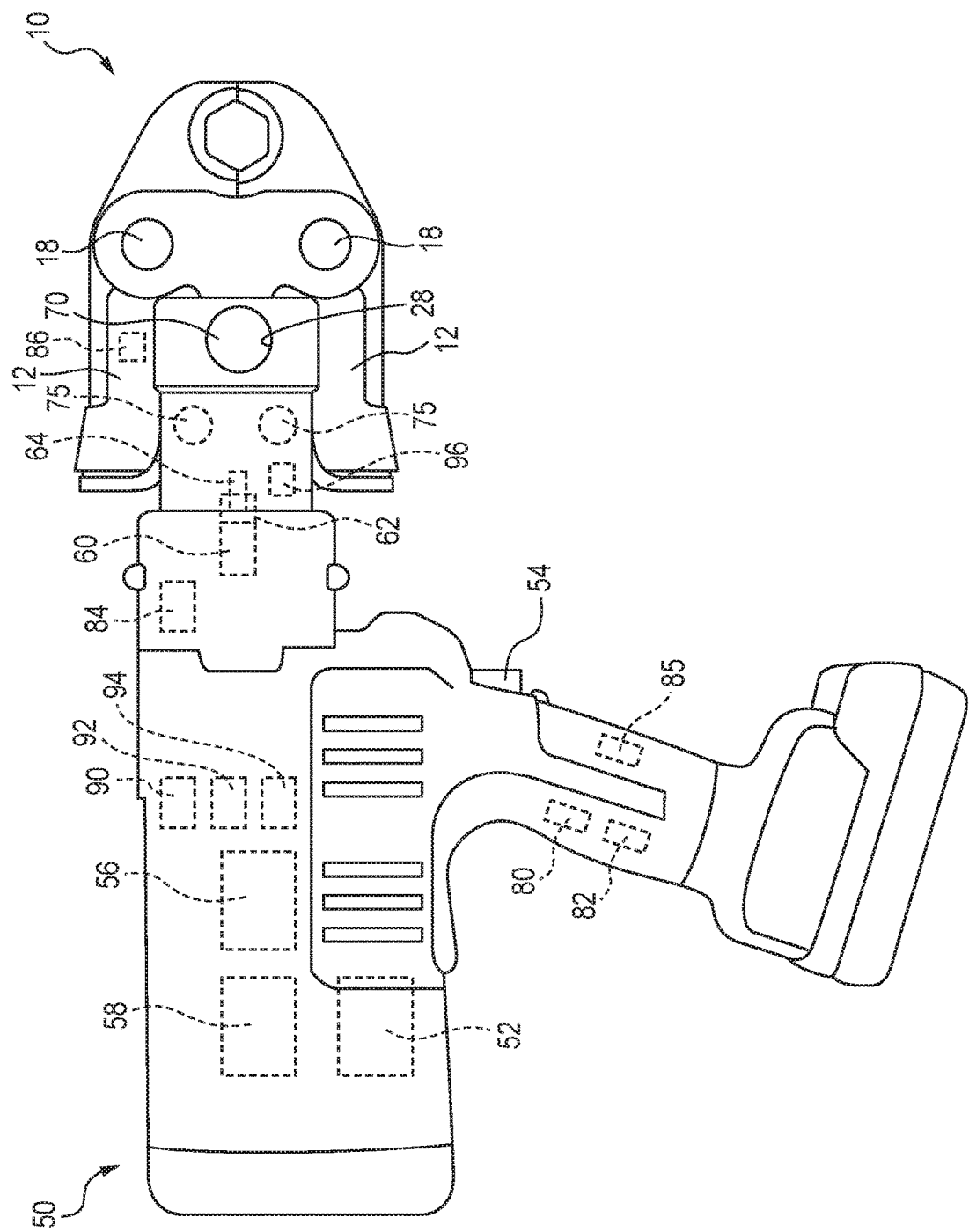
FIG. 1 is an illustration of an embodiment of a press tool and jaws in accordance with the present subject matter.

FIG. 1 shows an embodiment of a press tool with jaws in accordance with the present subject matter. When a user pushes or otherwise actuates a trigger, an electric motor in the press tool powers a pump in the tool, which pumps oil from a reservoir in the tool into a working cylinder also located in the tool. As the pressure in the working cylinder increases, a piston in the tool pushes onto a ram which is extendable from the tool.

Specifically, FIG. 1 illustrates a press tool 50 with a jaw set 10 engaged therewith. The press tool 50 includes a motor, typically an electric motor 52 actuated by a displaceable trigger 54. The press tool 50 additionally includes a pump 56 for pumping hydraulic fluid or oil from a reservoir 58 into a working hydraulic cylinder 60. Movably disposed in the cylinder 60 is a piston 62 which can be displaced by action of the hydraulic fluid in the cylinder, to engage and correspondingly displace a ram 64.

Figure 2:
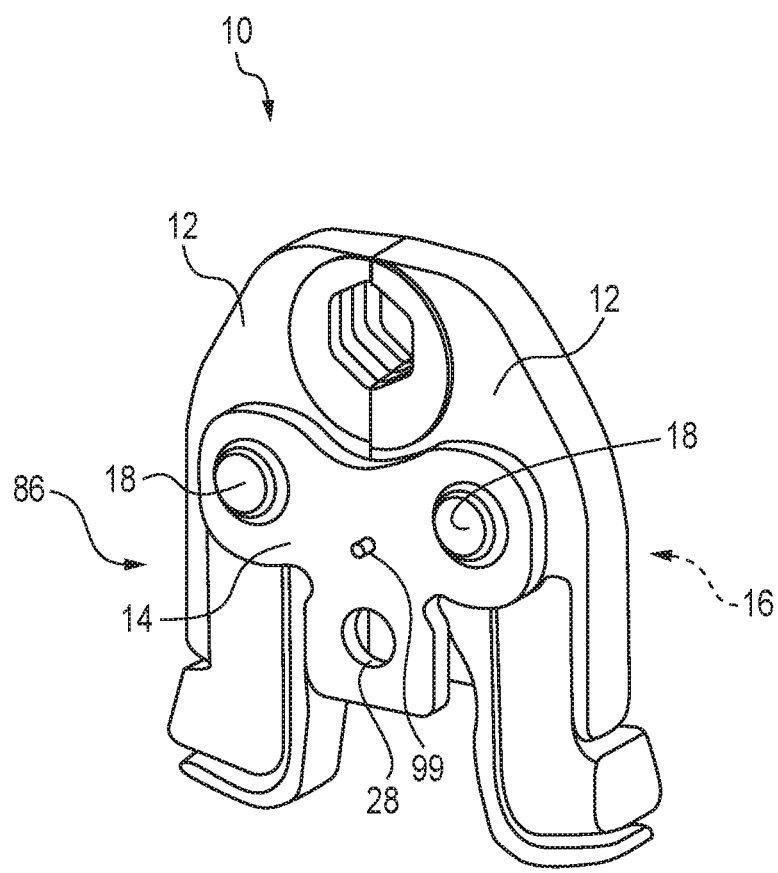
FIG. 2 is an illustration of an embodiment of jaws in isolation used in association with the press tool depicted in FIG. 1, in accordance with the present subject matter.

Referring further to FIG. 1, at the working end or nose of the press tool 50, the jaw set 10, press jaw assembly, or jaw pair as shown in isolation in FIG. 2, is removably attached with a jaw pin 70. The jaw set 10 comprises two opposing jaw arms 12, each with a press profile on one end and typically two cam profiles on the opposing end. The two jaw arms 12 are held or retained by two side plate pins 18 between two T-shaped side plates 14, 16. The T-shaped side plates 14, 16 define holes 28 through which the jaw pin 70 connects the press jaw assembly 10 with the press tool 50. By pulling and withdrawing the jaw pin 70 from the holes 28, the press jaw 10 can be removed from the press tool 50.

Figure 3:
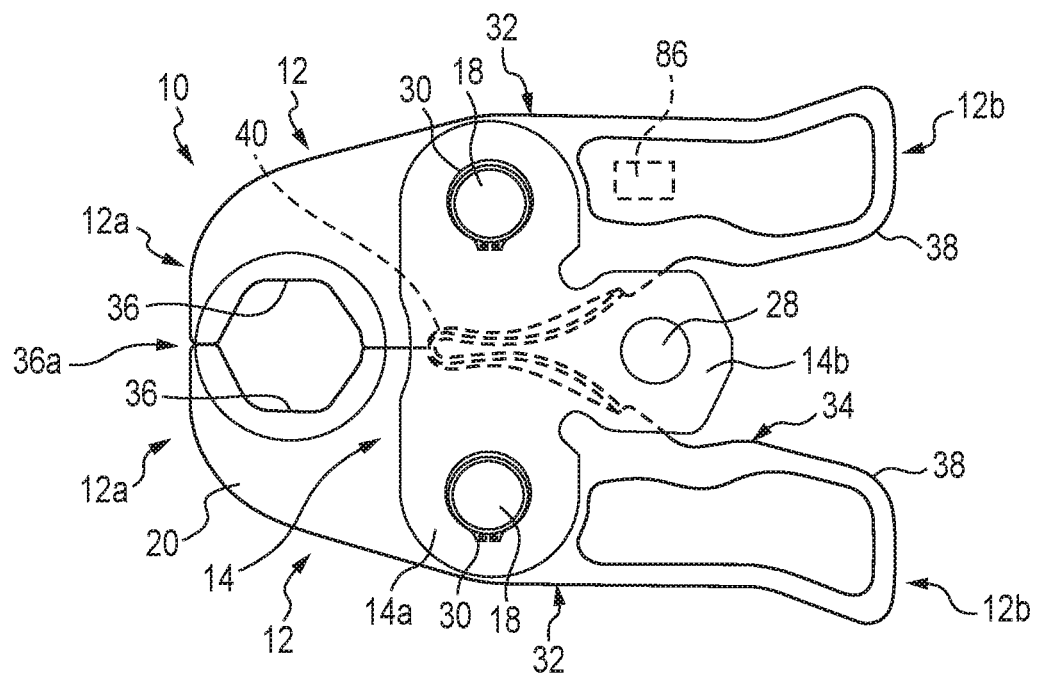
FIG. 3 is an illustration of another embodiment of jaws in accordance with the present subject matter.
Figure 4:
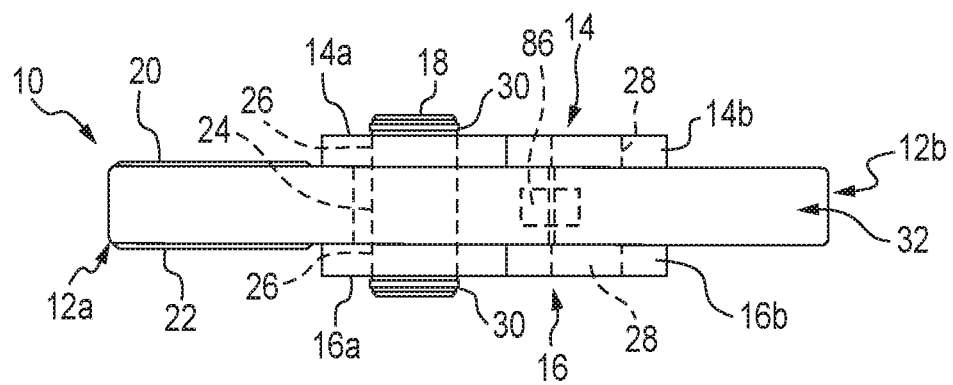
FIG. 4 is a top view of the jaws illustrated in FIG. 3.

FIGS. 3 and 4 illustrate another embodiment of a jaw set 10 comprising a pair of jaw arm members 12 which are mounted or retained, in the orientation shown in FIGS. 3 and 4, between side plates 14 and 16, respectively, by corresponding pivot or bearing pins 18. Each of the jaw arm members 12 has a first side 20, a second side 22, and a pin opening 24 therethrough for receiving the corresponding pin 18. Side plates 14 and 16 are generally T-shaped and include laterally opposite sides 14a and 16a, respectively, which are provided with aligned holes 26 for receiving the outer ends of the corresponding pin 18. Side plates 14 and 16 further include rear ends 14b and 16b, respectively, which are provided with aligned openings 28 therethrough which are adapted to receive a mounting or jaw pin such as the jaw pin 70 shown in FIG. 1 by which the jaw set is mounted on a drive unit for example a press tool, in a well-known manner. The jaw arm members 12 and side plates 14, 16 are retained in assembled relationship by spring clips 30 on the opposite ends of each of the pins 18.

Each of the jaw arm members 12 has longitudinally opposite front and rear ends 12a and 12b, respectively, and laterally outer and inner edges 32 and 34, respectively, which are spaced from opening 24 and extend forwardly and rearwardly of the opening. Inner edges 34 of the jaw arm members 12 are provided with laterally inwardly open opposed jaw recesses or press profile 36 at front ends 12a and forwardly of the side plate, and laterally inwardly facing cam surfaces 38 at rear ends 12b and rearwardly of rear ends 14b and 16b of the side plates. Inner sides 34, laterally inwardly of pin openings 24, receive and support a hairpin-shaped spring 40 which biases jaw arm members 12 in opposite directions about pins 18 to bias jaw recesses 36 laterally inwardly toward one another. Each of the jaw recesses 36 is integral with the corresponding jaw arm member 12, and the recesses 36 are contoured to provide working surfaces which cooperatively engage about component parts such as fittings to be joined by compression.

Referring to FIGS. 1 and 3, the ram 64 of the press tool 50 holds a set of rollers 75 that act on the two opposing cam profiles 38 on the jaw arms 12. As the ram and roller assembly extends outward and acts on the two opposing cam profiles 38, the ram assembly forces the jaw arms 12 apart. The jaw arms 12 rotate around the side plate pins 18 and the working front end 12a with the press profile 36 pushed towards a closed position.

Once the press jaw assembly 10 reaches the closed position and the tips 36a on the press profile 36 contact one another, the pressure in the cylinder 60 of the press tool 50 increases quickly. Typically, a pressure relief valve in the hydraulic circuit opens when a preset maximum pressure in the cylinder 60 is reached. This maximum pressure corresponds to a maximum piston force generated and exerted onto the jaw arms, the side plate pins, the T-shaped side plates, and the central jaw pin. Additional details of pressing tools, jaw assemblies, and their operation are provided in U.S. Pat. No. 7,421,871 for example.

As noted, when in use, the jaw set 10 is releasably engaged with a press tool such as the press tool 50 in a well known manner by means of a pin such as the pin 70, which is attached to the press tool and received in side plate openings 28. Ends 12b of the jaw arm members 12 are then manually displaced toward one another to pivot the arm members about pins 18 against the bias of spring 40 to open the jaw recesses 36 to receive a pipe and coupling to be compressed for example and, upon release of the jaw arm members, spring 40 closes the jaw recesses 36 about the pipe and coupling. The drive unit or press tool 50 is then actuated for the cam rollers 75 thereon to advance axially forwardly of the jaw set 10 and simultaneously engage against cam surfaces 38 to displace jaw arm members 12 about pins 18 for jaw recesses 36 to compress the pipe and coupling together. Thereafter, the drive unit 50 is actuated to withdraw the cam rollers 75, and the jaw arm members 12 are again manually displaced against the bias of spring 40 to open the jaw recesses 36 for removal of the jaw set 10 from the compressed pipe and coupling.

Not all press connections require the same maximum force to be completed. For example, a common ½ inch press fitting may require approximately 15 kN of axial ram force to be completed. Such completion is typically indicated by closure or contact between the jaw tips, for example tips 36a shown in FIG. 3. In contrast, a 2 inch copper fitting may require the maximum force of 32 kN that the tool can generate. However, as the tool will typically operate until the maximum pressure is reached, the press jaws for smaller fittings, i.e., smaller press profiles, will see the same force as press jaws configured to press larger fittings. Therefore, the load bearing components of the smaller jaws need to be configured to withstand the same load as the components of the larger jaws, even though the press connection does not require such a high force. As a result, these smaller jaws end up being heavier than would otherwise be necessary due to the relatively high forces required for the press connection.

In certain instances, the components of the press jaw may become highly stressed such that they will experience fatigue failures after extended use. Certain design measures have been known to direct these failures into areas of the jaw where the failure is obvious to the user and rendered safe, such that no parts become dislodged from the assembly. Examples of such design measures are provided in U.S. Pat. No. 7,260,975 or 7,578,159, for example. The typical failure for a jaw is a crack in the side plate originating or forming from the side plate pin holes in the side plates. These cracks typically occur after approximately 10,000 load cycles.

The present subject matter enables optimization of the jaws for the force actually required to complete the press connection rather than designing every jaw according to the maximum tool force and as a consequence, overdesigning the jaws for smaller press fittings. In one embodiment of the present subject matter, a passive electronic chip or similar component is embedded or otherwise incorporated into each jaw set or assembly for identification and/or providing information relating to the jaw assembly. The chip could be an RFID chip or an NFC chip, or any other suitable passive device. The chip or similar component contains or includes information that is transmitted by the jaws or which is read or otherwise sensed by the press tool. Such information relates to the size, properties, force-handling capacity, and/or other aspects of the jaws. FIGS. 1-4 illustrate a representative chip 86 incorporated in the jaw set 10. Although in many embodiments, a passive chip is used, the present subject matter also includes use of active chips.

In addition, the press tool is preferably enabled to end a press cycle at any pressure up to the maximum pressure the tool can deliver. Termination of the press cycle is based at least in part upon the information from the jaws. To accomplish this, the press tool can be controlled with a pressure sensor and a solenoid valve. For example, a press tool having a pressure sensor and solenoid valve could be used, both of which are in a hydraulic circuit of the press tool. For additional safety, the tool could also incorporate a pressure relief valve that automatically limits the maximum system pressure. The pressure relief valve is also located in the hydraulic circuit of the press tool. FIG. 1 illustrates the press tool 50 comprising a pressure sensor 90, preferably configured for sensing pressure in the hydraulic circuit of the tool; and a solenoid valve 92, preferably located in the hydraulic circuit of the tool. The press tool 50 may optionally also include a pressure relief valve 94, which preferably is located in the hydraulic circuit of the tool.

Additionally in certain embodiments, the tool includes a receiver that can communicate with and/or receive information from the chip in the jaw. Before each press operation, the tool will "read" the information from the chip embedded into the jaw, which could include one or more of the following information elements: an identification number of the press jaw, an identification of the press fitting, a press force value required to complete the press connection, and/or combinations of these. FIG. 1 further illustrates the press tool 50 with a receiver or communication provisions 84 for receiving information associated with a jaw assembly to be used with the tool, and particularly a chip such as the chip 86 in the jaws.

In yet another embodiment, a lookup table could be programmed or otherwise stored into a tool controller or other memory component to determine the appropriate press force and/or tool pressure, for the jaw mounted onto the tool. With this information, the tool can set the pressure limit to the correct pressure for the press connection, thus avoiding overloading the press jaw beyond the point of complete jaw tip closure. By loading the jaw only with the load required by the press fitting, and avoiding an "overload" condition, the load bearing components can be designed with less material. On the other hand, by leaving the design of the load bearing components unchanged, a much longer fatigue life may be accomplished. In actuality, a compromise between longer life and lighter weight may be the most desirable design target. FIG. 1 also illustrates the press tool 50 with a tool controller 80 and electronic or digital memory 82.

Figure 5:
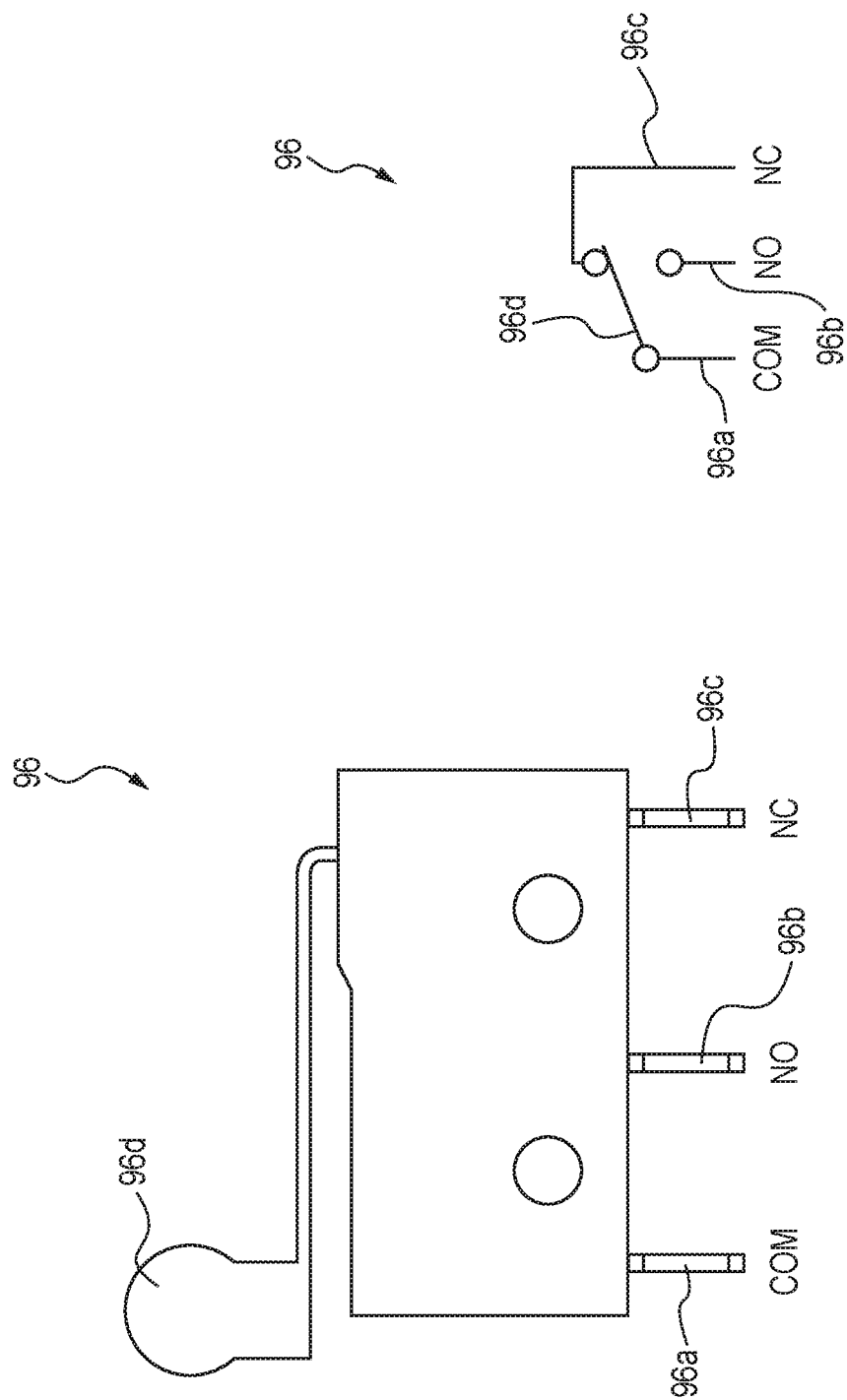
FIG. 5A is a schematic illustration of an embodiment of a magnetic switch used in certain press tools in accordance with the present subject matter.
FIG. 5B is a schematic illustration showing electrical connections of the magnetic switch depicted in FIG. 5A.

In certain embodiments, the press tool includes a magnetic switch that opens or closes an electrical circuit in the press tool. In particular embodiments, the magnetic switch operates, i.e., opens or closes, a hydraulic valve to release pressure within the hydraulic circuit of the press tool. The magnetic switch can be configured to sense the position of the hydraulic ram and/or rollers of the press tool. FIG. 1 further illustrates the press tool 50 comprising a switch which is preferably in the form of a magnetic switch 96. FIGS. 5A and 5B illustrate an embodiment of a magnetic switch 96 used in a press tool such as the press tool 50 in accordance with the present subject matter. FIG. 5B illustrates output state(s) of the switch 96. The switch 96 provides a "normally open" (NO) circuit via contacts 96a and 96b, and a "normally closed" (NC) circuit via contacts 96a and 96c. The switch opens or closes these circuits by actuation of a sensing element 96d. The magnetic switch 96 can be used in the press tool 50 by operating one or more components in the press tool, and particularly a hydraulic valve located in the hydraulic circuit of the press tool. Typically, such hydraulic valves are positionable between an open state and a closed state based upon the output state of the magnetic switch. For example, the magnetic switch 96 in the press tool 50 is configured to sense a position of the ram 64 and/or the rollers 75. Upon reaching such position, the sensing element 96d of the switch 96 is actuated thereby opening or closing a circuit to which one or more contacts 96a, 96b, and 96d are in electrical communication. Opening or closing of the electrical circuit may in turn actuate a solenoid valve in the hydraulic circuit to release pressure therein, for example.

Figure 6:
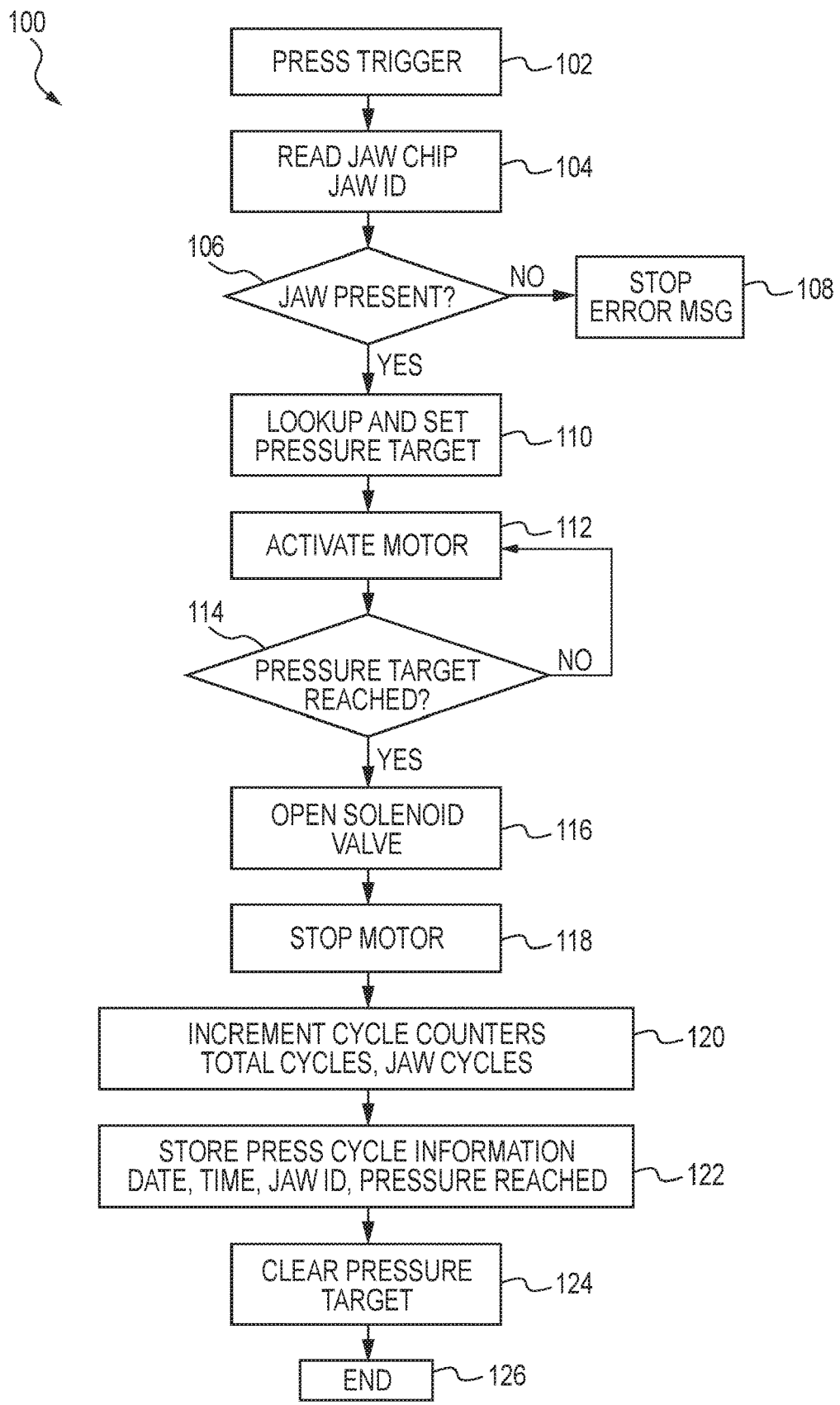
FIG. 6 is a flowchart for an embodiment of a method in accordance with the present subject matter.

FIG. 6 is a flowchart illustrating an embodiment of a method 100 for use of a jaw set or jaw assembly with a press tool in accordance with the present subject matter. The method 100 is performed using a jaw assembly including a passive or active electronic chip incorporated into the jaw assembly for identifying and/or providing information relating to the jaw assembly. The method 100 is also performed using a press tool including communication provisions for receiving information associated with the jaw assembly. Upon engaging a jaw set with a press tool such as for example the jaw set 10 and press tool 50, a user presses or otherwise actuates a trigger of the press tool in operation 102 to initiate operation of the press tool 50. The press tool reads or otherwise receives information from the jaw set as described herein. For example, the press tool can read a chip incorporated in the jaw set 10 and identify the jaw set and its characteristics. This is shown as operation 104. The press tool may also assess whether a jaw set is present, i.e., engaged with the tool in operation 106. If engagement is not detected or confirmed, an error message is provided by the tool in operation 108. The tool then utilizes the information received from operation 104 and/or 106 determine an appropriate set pressure target that in turn will limit the output force of the press tool. The set pressure target can be obtained from a lookup table or matrix stored in the tool memory, or calculated based on computational guidelines or algorithms in the tool circuitry. It is also contemplated that the tool may request and receive the set pressure target information from external sources. These operations are collectively denoted as 110 in FIG. 6. In operation 112, the motor of the press tool is activated. This in turn operates the hydraulic pump which urges the piston and ram against the jaw set. The pressure in the hydraulic cylinder or lines in fluid communication therewith, will correspondingly increase. A pressure sensor monitors the pressure in operation 114 until the pressure target is reached. As will be understood, the motor continues to operate until the pressure target is reached, as shown in FIG. 6. Upon the pressure sensor sensing the pressure in the hydraulic cylinder/lines has reached the pressure target, the tool control circuitry opens a solenoid valve in operation 116 thereby releasing pressure in the hydraulic circuit. The motor is stopped in operation 118. In addition, the method 100 optionally can also include one or more data collection operations collectively shown as operations 120 and 122, in which cycle counters can be incremented to count total cycles, jaw operation cycles, or other operational parameters. Information or data from operation 120 can then be stored in digital memory in the tool and/or in external memory. Non-limiting examples of such information can include press cycle information, date, time(s), jaw identification numbers, and/or pressure(s) reached. In operation 124, the pressure target value is cleared or otherwise reset. The method 100 concludes at 126.

If the chip is located in the jaw area where a fatigue crack is expected to occur, the chip will be damaged or destroyed when the crack occurs. This prevents the jaw from being used even when the crack is not yet visible.

To simplify the jaw designs, in a particular embodiment of the present subject matter, two or more and typically three or four "loaded classes" are defined. Instead of setting the tool pressure individually for each jaw, the jaws can be grouped in these load classes. This way, the load bearing components of a jaw can be shared between the jaws in one load class.

Figure 7:
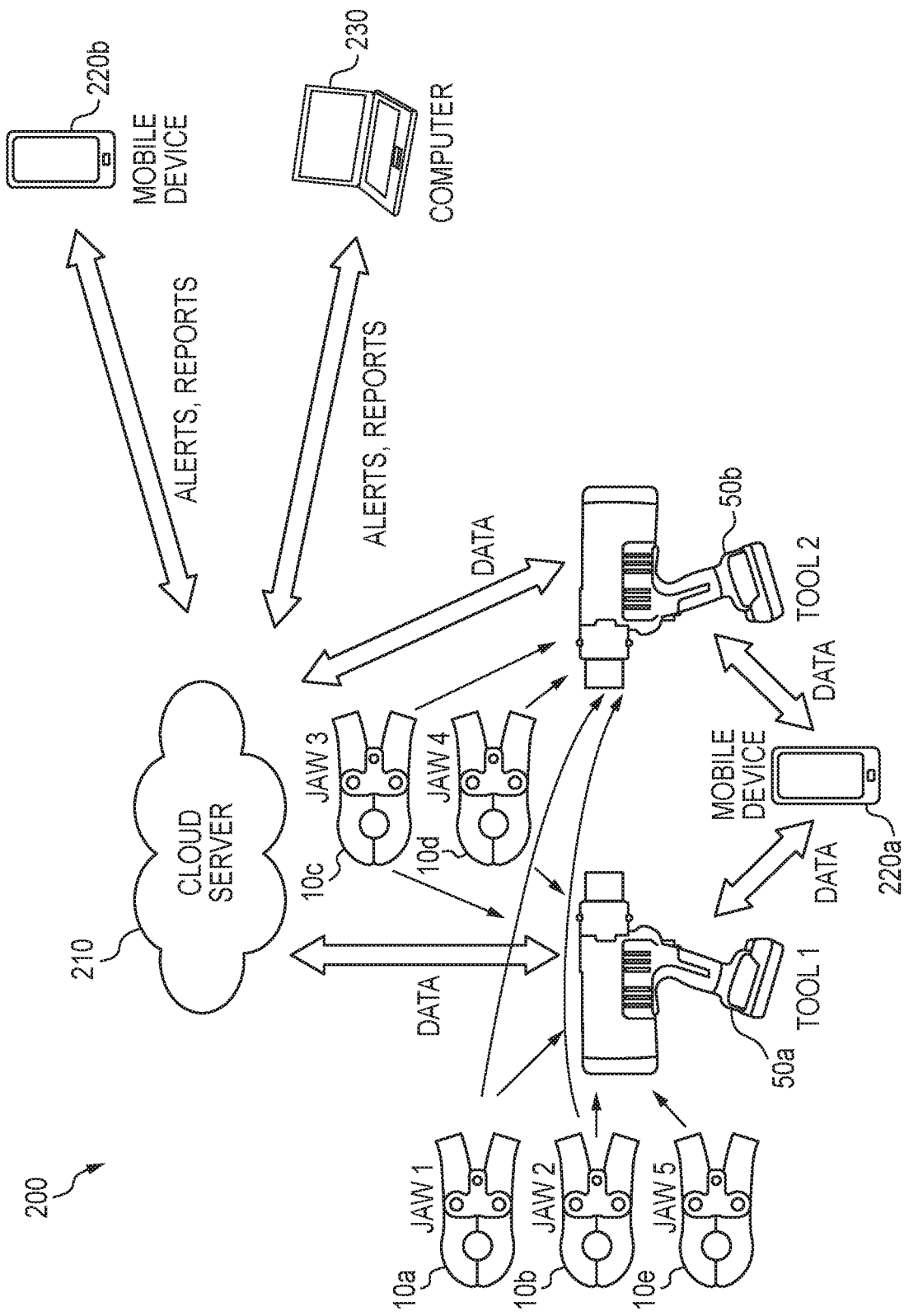
FIG. 7 is an illustration of an embodiment of a system in accordance with the present subject matter.

The tool may also incorporate data connectivity capabilities, for example via Bluetooth, Wifi, or a cellular connection, as depicted in a system shown in FIG. 7. In certain embodiments, the tool is configured to store the information associated with each crimp, for example date, time, jaw identification, actual pressure reached and combinations of these parameters optionally with other information or data. This information can be transferred to a cloud server for example once the tool is connected. The cloud server can keep track of the number of cycles for each tool, number of cycles for each jaw, the dates and times for each press connection, the actual pressure for each press connection, and the size and type of fittings that had been crimped. The cloud server can maintain a complete usage history for each tool and each jaw by combining the information received from different tools in the network. With this information, the cloud server can provide the tool owner (or registered user) with warnings about a tool approaching a necessary service event, or about a specific jaw that is approaching the end of its cycle life. The cloud server can also provide a complete history of number of press operations, size of jaws, location of the press connection, for example by using GPS tags created or otherwise stored in the tool. This information can for example be used to create detailed job reports.

The cloud server receives information and data, retains information and data, administers access and use permissions, and governs user access to, and use of, tools registered with the system. The cloud server in many embodiments of the present subject matter is provided by one or more computer servers or units which may be remotely located. As described herein, typically the one or more cloud server(s) is accessed via the internet and can include cloud-based storage, processing, and/or communication. Cloud storage is a model of computer data storage, in which digital data is physically stored on multiple servers (sometimes in multiple locations), wherein the physical environment is typically owned and managed by a cloud storage provider, responsible for keeping the data available and accessible, and the physical environment protected and running.

The cloud server of the present subject matter may include a database and data storage provisions in which user information is stored and securely retained. Non-limiting examples of retained information include authorized user name; registrant name if different from authorized user name; company or organization name; contact information of user, registrant, and/or company; date of initial registration of user and/or tool(s) and optionally dates of subsequent registrations or logins; password(s) and other confidential information relating to a user, a registrant, and/or a company; designation or status of user, registrant, and/or company, e.g., industrial, contractor, builder, or home user; location of registered user and/or tool; preset or predesignated tool parameters to be monitored and their associated parameter limits; actual use-based tool parameters that are monitored; warnings or indicators associated with registered tools or users; status of warnings or indicators; and other information and data including IP addresses used to register smart tools or to enable each tool.

In select embodiments, the cloud server may include electronic communication systems or provisions (wireless and/or cellular) for enabling the cloud server to exchange, transmit, or receive information (such as above-mentioned data gathered during smart tool operation) from the one or more mobile electronic devices, one or more tools, and/or one or more computers. In many embodiments of the present subject matter, the cloud server includes internet communication provisions.

In many versions of the present subject matter, the tool systems and particularly the cloud server use cloud-based storage systems and/or cloud-based data-processing and storage systems that can be accessed and implemented in a distributed fashion using remotely located servers or other computers. Typically such servers, computers and/or other devices are accessed via the internet.

In connection with the present subject matter, cloud-based storage and/or cloud-based processing refers to online storage and/or processing by which data is stored (either virtually or actually) and/or processed across one or multiple servers, typically hosted by commercial internet service providers. In embodiments, the term "cloud-based computing" refers to one or more cloud-based data storage, cloud-based data processing, or cloud-based data communication components. Also, commercial internet service providers may include data centers, able to virtualize certain resources based on customer requirements. The data storage services of such providers may be accessed via web service application programming interfaces ("API") or via web-based user interfaces ("UI"). Cloud-based computing is described in the prior art including, for example, WO 2013/141868; US 2012/0060165; WO 2013/119247; and US 2011/0153868.

The tool systems of the present subject matter may also include at least one electronic-based mobile device. Non-limiting examples of such mobile devices include personal data assistants ("PDAs"), smartphones, tablet computers, laptop computers, and so forth. More particularly, a preferred mobile device for the present subject matter includes a computing device having a small-form factor portable electronic device such as a mobile phone or smartphone, or, alternatively, a personal data assistant ("PDA"), a personal media-player device, an application-specific device, such as a tablet computer or a slate computing device, or a hybrid device that may include any of the above-noted functions. Nonlimiting examples of smartphones include devices running on ANDROID or IPHONE, e.g., iOS, platforms. Nonlimiting examples of tablet computing devices include IPAD available from Apple Corporation. Nonlimiting examples of a personal media player device is an IPOD or more particularly an IPOD TOUCH available from Apple. The mobile device may also be in the form of a personal computer including both laptop computer and/or non-laptop, e.g., desktop, computer configurations.

The electronic mobile devices of the present subject matter include electronic data storage provisions, control provisions, communication provisions, user interface provisions, and more. The electronic mobile devices may also include provisions for location services from the mobile devices. Data storage provisions of the mobile devices enable information relating to smart tool use, user information, data, and permissions to access data from the cloud server to be stored on the system and accessed at the mobile device. The data storage provisions can be in the form of known data storage formats including flash-memory components. Such data storage provisions may also include or be in the form of memory cards, disk or drive components, data cartridges or components such as ROM or RAM memory, and peripheral data-storage components.

Control provisions of the mobile devices typically include electronic circuitry, generally in the form of one or more processors. In embodiments, mobile devices may control data and/or information exchange or transmission with one or more tools registered with the system. As mentioned above, the electronic mobile devices relay activation signal(s) issued from the cloud server to the tool(s). The activation signals may include activation signals that are registered and/or within an acceptable geolocation.

The mobile devices of the present subject matter also include communication provisions operatively effective between the mobile device and one or more tools; and also operatively effective between the mobile device and a cloud server of a tool system. Communication between the mobile device and the tool(s) can be established or provided using one or more communication formats such as radio frequency ("RF"), infrared ("IR"), and/or BLUETOOTH as known in the art. Specifically, the term "BLUETOOTH" relates to a wireless technology standard that is used for exchanging data between fixed and mobile devices over short distances using short-wavelength UHF radio waves via, for example, industrial, scientific and medical radio bands, of from about 2.402 to 2.480 GHz, and Personal Area Networks ("PANs") established in certain buildings, both public and private, as well as certain other areas. In particular embodiments, wireless communication is via wireless local area network ("WLAN"), also known as, Wi-Fi. The present subject matter includes using other types of communication, e.g., near-field communications ("NFC"). And for such purposes, a nonlimiting list of suitable wireless protocols, enabling wireless communication between at least one electronic mobile device and at least one smart tool(s), both of which are configured for exchanging data via wireless communication links, include ZIGBEE, GLOWPAN, Wireless HART, ISA 100, WiMi, SimpliciTI, KNX, EnOcean, Dash7, WISA, ANT, ANT+, WiMax, ONE-NET, Z-Wave, Insteon, and RuBee. A particularly preferred form of electronic communication, cellular communication, is discussed below. Also, as an alternative to wireless and/or cellular communication, electronic signal transmission including transmission of data or other information, between at least one mobile device and a tool, can also be established by cables or other hardwired connections.

Mobile devices may be communicatively coupled to cloud-based service and data centers and/or a third party entity via, e.g., at least a wireless local area network technology (WLAN), i.e., Wi-Fi. However, embodiments of local access to cloud-based storage are not limited to wireless communications, and therefore hard-wired communications may also apply to the embodiments described herein.

The various electronic mobile devices of the present subject matter thus are configured to include electronic communication provisions between the at least one mobile device, one or more tools, and the cloud server. Typically, such electronic communications are transmitted and exchanged via the internet, and often utilize a cloud-based infrastructure. However, the present subject matter includes using other communications between a mobile device and the cloud server.

The electronic mobile devices may also include one or more user-interface provisions. For instance, a mobile device could be in the form of a portable electronic computer, for example an "IPAD." Or, another suitable electronic mobile device could include a keyboard, provided either virtually or as a physical input device incorporated into the body of a mobile device or separable from but connectable to the mobile device. Still other input components could be used such as mouses, track balls, touch screens, keyboards, and joysticks for example. Also, an electronic mobile device of the present subject matter typically includes a display or other information output, enabling such information to displayed for or viewed by a user. While such display is typically incorporated into the mobile device, the present subject matter contemplates using separate but connectable displays.

As previously noted, the mobile devices also include electronic data storage provisions and tool use control provisions. In select embodiments of the present subject matter, the mobile device is configured to run or execute an algorithm or "app" as known in the art which facilitates communication with the cloud server and/or the smart tool. Apps, their transfer or download, and the "running" and maintenance of such "apps" are described in the prior art including U.S. Pat. No. 8,549,656; US 2013/0122861; WO 2013/163249; and WO 2012/155937. In relation to the present subject matter, the algorithm or app selected for a tool system may also facilitate administration of permissions from the cloud server, transmission of data or information between the cloud server and the mobile device, and/or between the cloud server and an electronic mobile device and at least one of the tools of the present subject matter. The algorithm or app may also facilitate user access, use of one or more smart tools of interest, and/or provide indications and/or warnings to a user concerning the tools and/or the system.

The tools and typically the press tools of the present subject matter may also include inter-connectivity provisions that enable a tool to communicate with, i.e., undertake data transmission and/or information exchange, with one or more mobile devices, computer(s), and/or cloud server(s) in accordance with the present subject matter. FIG. 1 illustrates the press tool 50 with such interconnectivity provisions 85.

FIG. 7 is an illustration of a system 200 in accordance with the present subject matter. The system 200 comprises one or more cloud server(s) 210; one or more powered drive units or powered tools such as press tool 50*a* and press tool 50*b*; and one or more tool accessories such as jaw sets 10*a*, 10*b*, 10*c*, 10*d*, and 10*e*. The powered tool(s) include interconnectivity provisions such as provisions 85 for communicating with the cloud server(s) 210 and/or mobile device(s). One or more of the tool accessories include a chip such as the previously noted chip 86, and one or more of the tools include communication provisions for receiving information from the chip(s), such as the previously noted provisions 84. The system 200 may also comprise one or more mobile devices such as mobile devices 220*a* and 220*b*. The mobile device(s) include communication provisions for data transfer and/or information exchange with other components of the system 200. The mobile devices can additionally include other features as described herein. The system 200 may also comprise one or more computers 230. The computer(s) 230 can include communication provisions for data transfer and/or information exchange with any of the cloud server 210; the tool(s) 50*a*, 50*b*; and/or the mobile devices 220*a* and 220*b*.

The present subject matter also provides a method for monitoring and/or managing tools and accessories thereof. Referring further to FIG. 7, jaws such as jaws 10*a*, 10*b*, 10*c*, 10*d*, and 10*e*, are categorized into two groups, for example a first group of 1¼ inch jaws or less which requires 24 kN, and a second group of from 1 inch to 2 inch jaws which requires 32 kN. The present subject matter includes the use of a single group, three groups, four groups, and five or more groups of jaws. For many press tools, the pressing tool default force is a relatively high force such as 32 kN (53 Mpa). In certain embodiments, the pressing tool(s), such as tools 50*a* and 50*b*, includes a pressure sensor such as the pressure sensor 90 in FIG. 1. In certain embodiments, the pressing tool(s), such as tools 50*a* and 50*b*, includes a magnetic switch to release a hydraulic pressure valve. For example, one or more of the tools 50*a* and 50*b* can include a magnetic switch such as the magnetic switch 96 shown in FIGS. 1, 5A, and 5B. The magnetic switch can be configured to release pressure in the hydraulic circuits of the tools 50*a* and 50*b* by actuation of a hydraulic pressure valve, for example the previously noted solenoid valve 92 shown in FIG. 1.

The present system can be configured to monitor jaw and press tool use and provide service and/or usage alerts. For example, with further reference to FIG. 7, pressing cycles are counted and cumulative totals are monitored for each jaw set in the system. Total cycles are tracked for each jaw set and tool. Table 1 provides a representative data matrix for such monitoring and/or managing:

TABLE 1

Representative Monitoring and Managing of Jaws and Tools in a System Total Use Cycles

| Jaws | Tool 1 | Tool 2 | Total |
|---|---|---|---|
| 1 | 4,322 | 2,170 | 6,492 |
| 2 | 3,182 | 6,422 | 9,604 |
| 3 | 5,270 | 150 | 5,280 |
| 4 | 7,320 | 582 | 7,902 |
| 5 | 8,212 | 0 | 8,212 |
|  | 28,306 | 9,324 |  |

Upon assessing the use data in Table 1 for example, data management provisions of the system may issue a service alert which may for example direct a user's attention to the fact that Tool 1 has been used a total of 28,306 cycles, and thus service inspection, or maintenance is recommended. Another example may be based upon total use cycles for one or more jaws. For example, Jaws 2 have been used a total of 9,604 cycles, and thus service inspection, or maintenance is recommended.

Specifically, and with further reference to FIG. 7, one or more tools such as tools 50a and 50 are provided with controls, memory, and/or processing provisions, for example the controller 80 and memory 82 depicted in FIG. 1. One or more tool accessories such as jaw sets 10a, 10b, 10c, 10d, and/or 10e are provided with chips such as the chip 86, for identifying and/or providing information relating to a corresponding tool accessory. The tools, for example 50a and 50b are also provided with communication provisions such as provisions 84 shown in FIG. 1, for receiving information associated with a corresponding tool accessory.

At least one tool is configured to monitor and preferably count use cycles which for a pressing tool is in the form of pressing operations. The tool is preferably also configured to monitor and count use cycles for each tool accessory used therewith. For example, the tool is also configured to monitor and count use cycles for each of the jaws 10a, 10b, 10c, 10d, and 10e. This data and information can be stored in memory in the tool and/or transferred to one or more other components such as the cloud server 210, the mobile devices 220a and/or 220b; and/or the computer 230.

Figure 8:
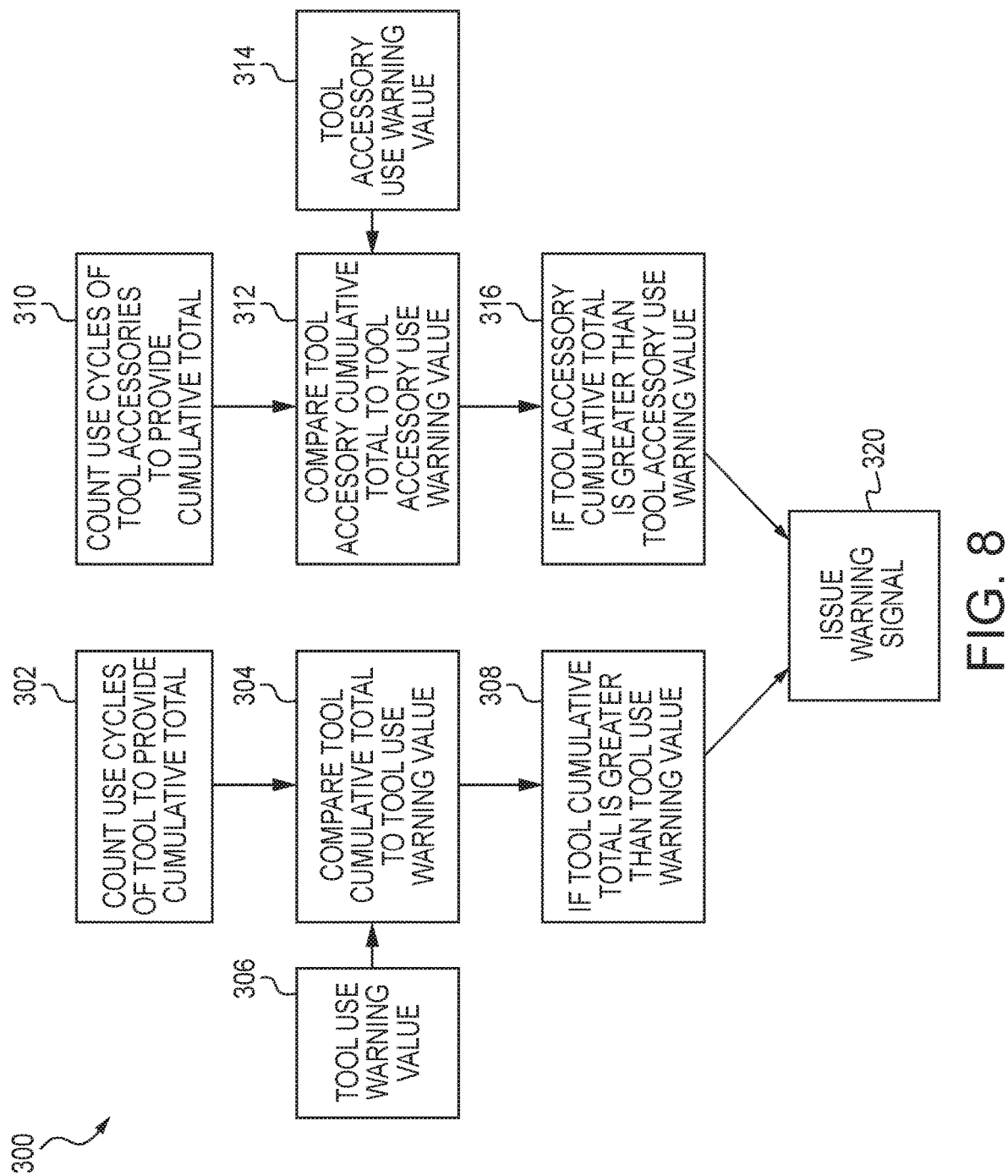
FIG. 8 is a flowchart for an embodiment of another method in accordance with the present subject matter.

FIG. 8 is a flowchart for an embodiment of another method in accordance with the present subject matter. Specifically, a method 300 is provided for managing a system of at least one tool and at least one tool accessory. The method 300 comprises one or more operations 302 in which use cycles of a tool are counted and a cumulative total is provided. In operation 304, the tool cumulative total is compared to a tool use warning value stored or otherwise provided at 306. In operation 308, if the tool cumulative total is greater than the tool use warning value, then a warning signal is issued in operation 320. The method 300 also comprises one or more operations 310 in which use cycles of a tool accessory are counted and a cumulative total is provided. In operation 312, the tool accessory cumulative total is compared to a tool accessory use warning value stored or otherwise provided at 314. In operation 316, if the tool accessory cumulative total is greater than the tool accessory use warning value, then a warning signal is issued in operation 320.

Additional details concerning use and incorporation of magnetic switches in tools are as follows. Generally, one or more magnetic switches are placed along the cylinder of the press tool. The location of the magnetic switch is determined based on the required travel of each jaw size. The controller inside of the tool is able to determine which magnetic switch (if multiple are installed) should be reached before the tool's motor is switched off. In certain embodiments, the magnetic switch is mechanically affixed to the cylinder at a location which is related to the travel of a jaw. In particular embodiments, multiple magnetic switches can be affixed to the cylinder at various locations which are related to the travel of a jaw. The present subject matter includes a controller which is capable of reading the mechanical switch and stopping the advance of the piston when a desired distance is travelled. And, the present subject matter also includes a controller which is capable of reading an attachment such as a jaw through the use of electronics and changing the desired travel distance based on the jaw's requirement.

Figure 9:
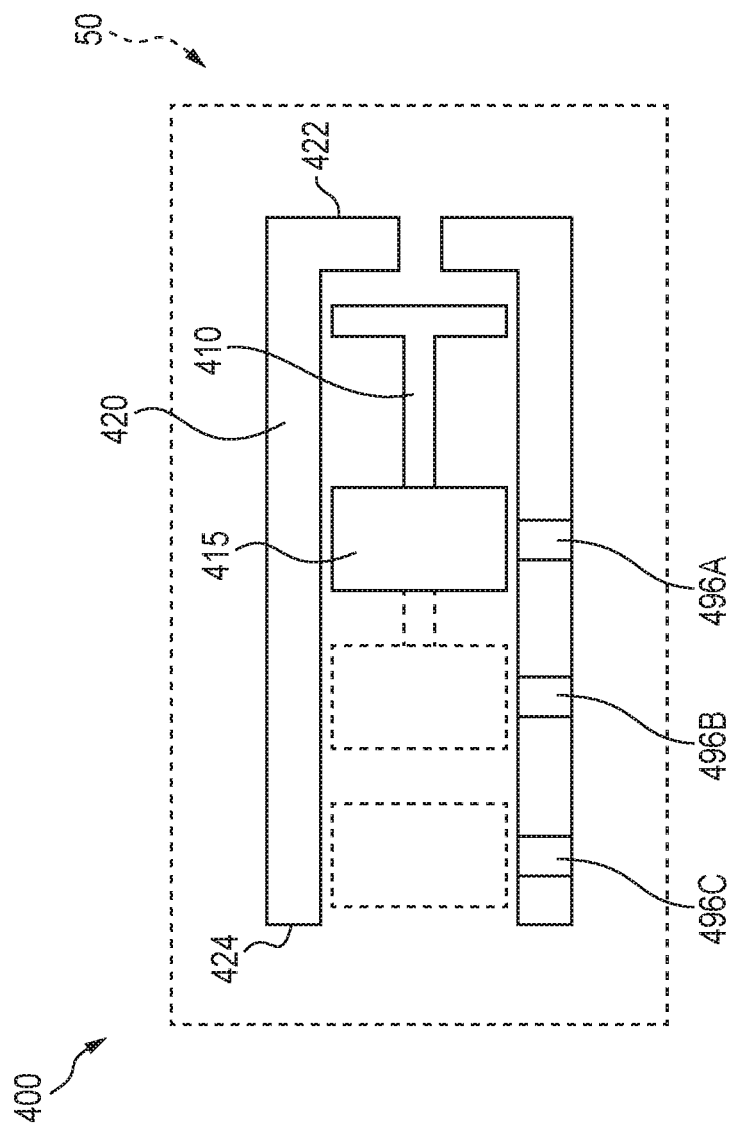
FIG. 9 is a schematic illustration of an embodiment of a hydraulic assembly in accordance with the present subject matter.

FIG. 9 is a schematic illustration of a hydraulic assembly 400 that can be utilized in the press tool 50. The assembly 400 comprises a hydraulic cylinder 420 and a ram 410 disposed within the cylinder 420. The ram 410 includes one or more roller(s) 415. The hydraulic cylinder defines a first end 422 and a second end 424. The hydraulic assembly 400 also comprises a plurality of magnetic switches, which in the version depicted in FIG. 9 includes three magnetic switches 496A, 496B, and 496C. Each of the magnetic switches is incorporated into the hydraulic cylinder 420 and particularly, a sidewall of the hydraulic cylinder 420. The magnetic switches 496A, 496B, and 496C are located between the ends 422, 424 of the hydraulic cylinder 420. During displacement of the ram 410 relative to the hydraulic cylinder 420, the roller(s) 415 move relative to the magnetic switches 496A, 496B, and 496C. Such movement and/or change in position of the roller(s) interacts with the magnetic switches and enables the press tool 50, and for example the controller 80, to sense or otherwise determine the position of the roller(s) 415 directly, including a "home" or closed position.

Figure 10:
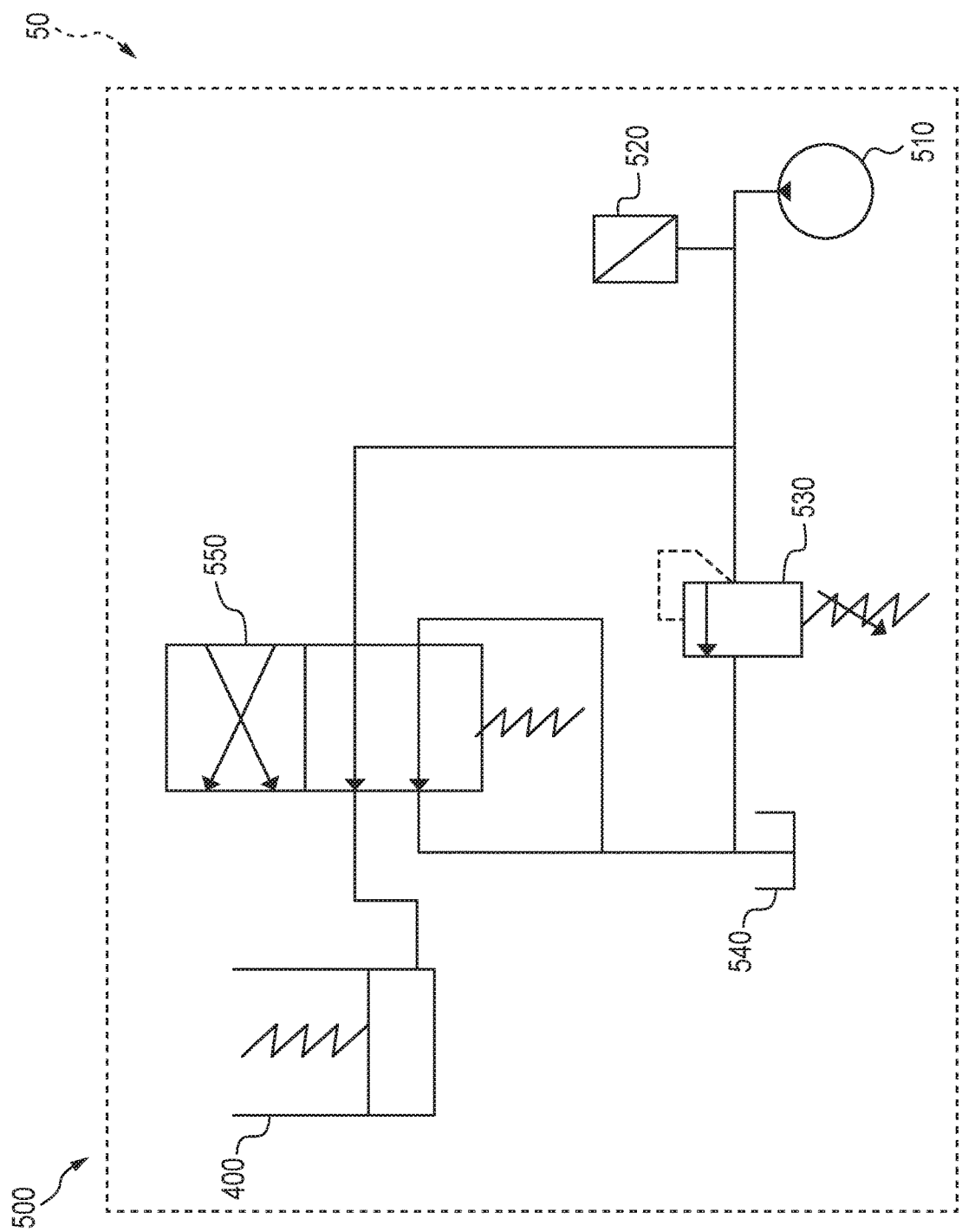
FIG. 10 is a schematic hydraulic circuit of a hydraulic system using the hydraulic assembly of FIG. 9, in accordance with the present subject matter.

FIG. 10 is a schematic hydraulic circuit of a hydraulic system 500 using the hydraulic assembly 400 depicted in FIG. 9, in a press tool 50. The hydraulic system 500 comprises a pump 510, a pressure transducer 520, a pressure relief valve 530, a tank or reservoir 540 holding hydraulic fluid, a solenoid valve 550, and the previously noted hydraulic assembly 400.

Figure 11:
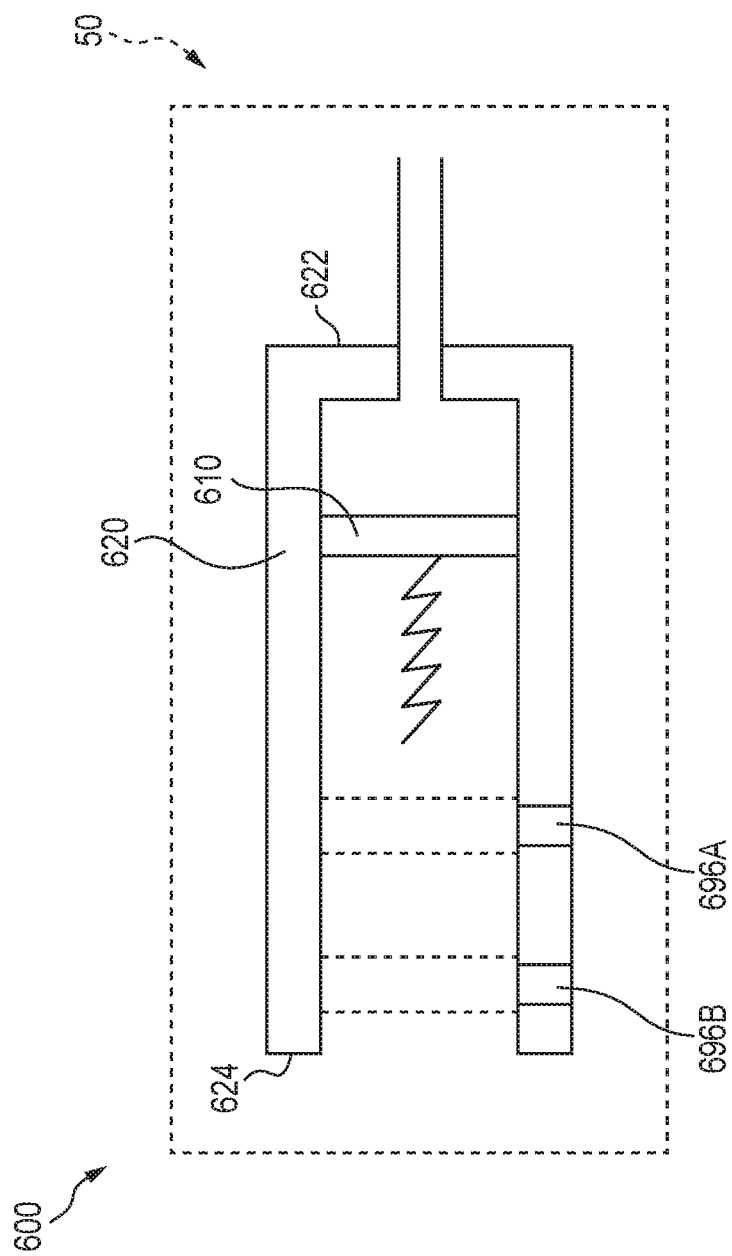
FIG. 11 is a schematic illustration of another embodiment of a hydraulic assembly in accordance with the present subject matter.

FIG. 11 is a schematic illustration of another hydraulic assembly 600 that can be used in the press tool 50. The assembly 600 comprises a hydraulic cylinder 620 and a piston 610 disposed within the cylinder 620. The hydraulic cylinder defines a first end 622 and a second end 624. The hydraulic assembly 600 also comprises a plurality of magnetic switches, which in the embodiment depicted in FIG. 11 includes two magnetic switches 696A and 696B. Each of the magnetic switches is incorporated into the hydraulic cylinder 620 and particularly, a sidewall of the hydraulic cylinder 620. The magnetic switches 696A and 696B are located between the ends 622, 624 of the hydraulic cylinder 620. During displacement of the piston 610 relative to the hydraulic cylinder 620, the piston 610 moves relative to the magnetic switches 696A and 696B. Such movement and/or change in position of the piston 610 interacts with the magnetic switches and enables the press tool 50, and for example the controller 80, to sense or otherwise determine the piston of the piston 610 directly, and/or that of other components in the press tool 50 such as a ram and/or roller(s).

Figure 12:
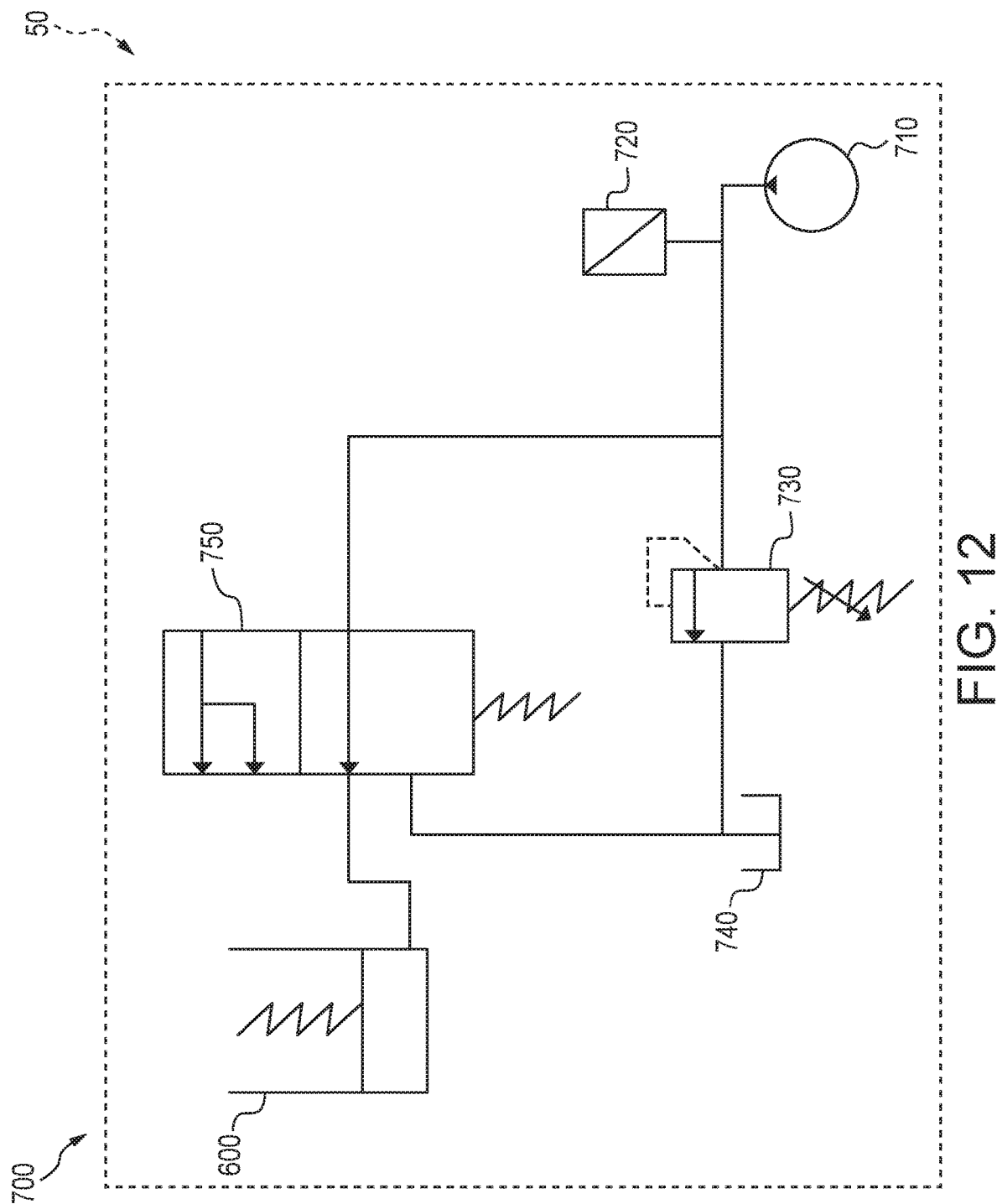
FIG. 12 is a schematic hydraulic circuit of a hydraulic system using the hydraulic assembly of FIG. 11, in accordance with the present subject matter.

FIG. 12 is a schematic hydraulic circuit of another hydraulic system 700 using the hydraulic assembly 600 shown in FIG. 11, in a press tool 50. The hydraulic system 700 comprises a pump 710, a pressure transducer 720, a pressure relief valve 730, a tank or reservoir 740 holding hydraulic fluid, a solenoid valve 750, and the previously noted hydraulic assembly 600. In the system depicted in FIG. 12, the solenoid valve 750 is a two (2) position solenoid valve 750.

In particular embodiments, the jaws below 1¼ inch have a unique feature, for example a noticeable tab or red area, preferably extending outward, on the side plate. When mounted on the tool, the tab can push or actuate a switch such as a micro limit switch on the tool to release hydraulic pressure such as via a valve when reaching a particular hydraulic pressure, for example 40 Mpa (24 kN). A representative tab 99 extending outward from a jaw side plate 14 or 16 is shown in FIG. 2 for example. It will be understood that the present subject matter is not limited to jaws having this noted size, or to the particular representative tab 99 and includes a wide array of outwardly extending members having other shapes and/or configurations which can be located at other regions of the jaws 10.

Figure 13:
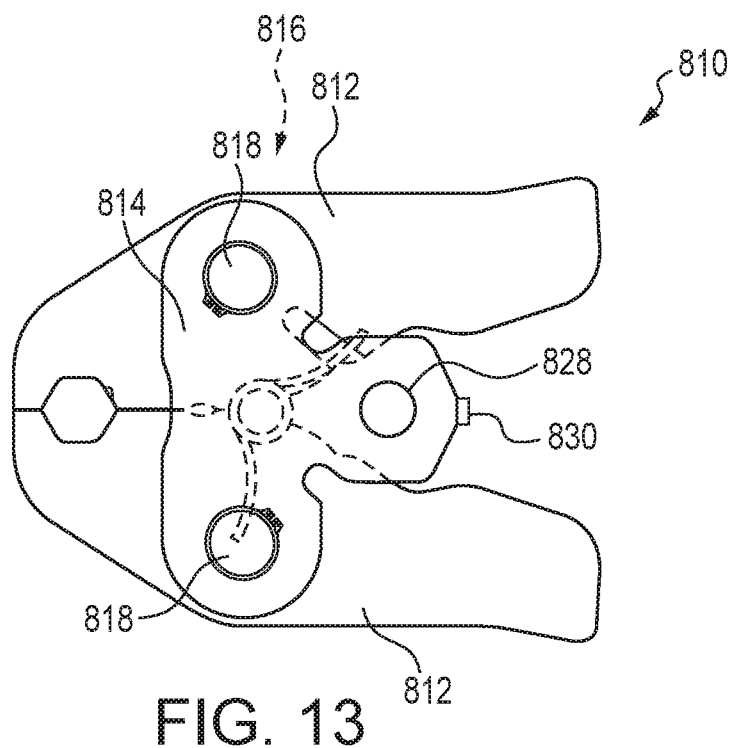
FIG. 13 illustrates another embodiment of jaws in accordance with the present subject matter.

FIGS. 13-16 illustrate another aspect of the present subject matter in which a jaw set is identified by providing a physical feature that is sensed or otherwise recognized by the press tool to thereby provide information to the press tool concerning the jaw set. Specifically, FIG. 13 illustrates an embodiment of jaws 810 used in a press tool described in greater detail herein. The jaw set 810 comprises two opposing jaw arms 812, each with a press profile on one end and typically two cam profiles on the opposing end. The two jaw arms 812 are held or retained by two side plate pins 818 between two T-shaped side plates 814, 816. The T-shaped side plates 814, 816 define holes 828 through which a jaw pin such as previously described jaw pin 70, connects the press jaw assembly 810 with the press tool. By pulling and withdrawing the jaw pin 70 from the holes 828, the press jaw 810 can be removed from the press tool. Additional features of the jaw assembly 810 are as previously described in association with the jaw assembly 10.

In this embodiment, at least one of the side plates 814, 816 includes a physical feature that is sensed or otherwise recognized by the press tool or related components, to thereby communicate information to the press tool, such information typically regarding the jaws 810 such as their size, capacity, and/or configuration. The information is utilized to control and/or govern operation of the press tool for example its motor. In the embodiment of FIGS. 13-16, the physical feature is in the form of a protrusion 830. In the referenced figures, the protrusion 830 extends rearwardly, i.e., toward a press tool upon engagement of the jaws 810 therewith.

Figure 14:
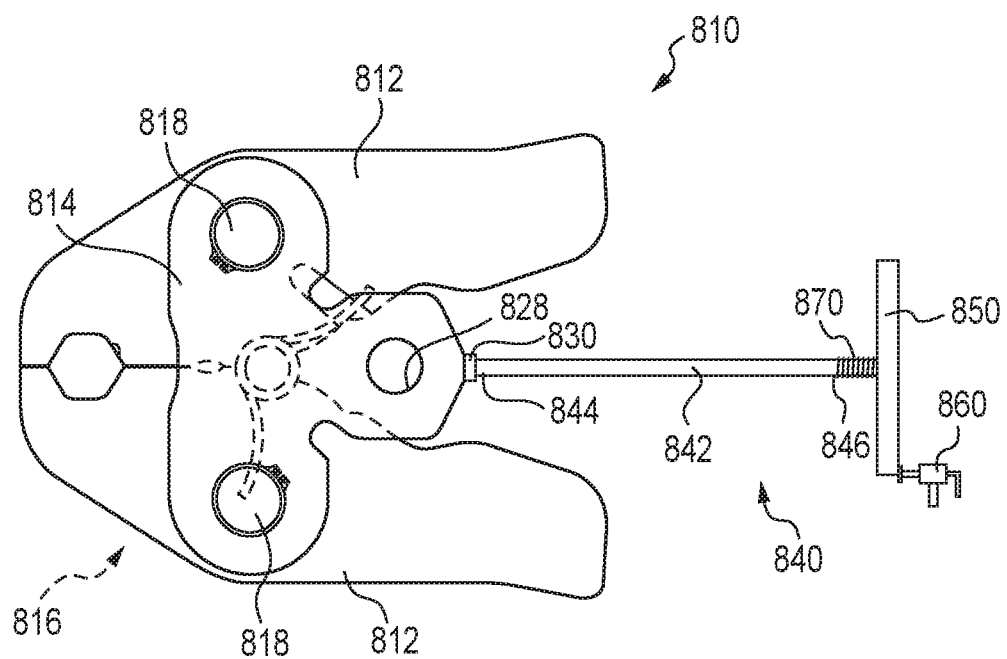
FIG. 14 illustrates the jaws of FIG. 13 in conjunction with an embodiment of a sensing assembly in accordance with the present subject matter.

FIG. 14 illustrates the jaw set 810 and a representative assembly 840 incorporated in a press tool that senses or recognizes engagement of not only a jaw set with the press tool, but engagement of the jaw set 810 due to contact with the protrusion 830. The sensing assembly 840 comprises a movable guide bar 842, a movable ring 850, a microswitch or sensor 860, and an optional spring 870 disposed between the guide bar 842 and the ring 850. The guide bar 842 defines a distal end 844 and an opposite proximal end 846. Upon engagement of the jaw set 810 with a press tool having the sensing assembly 840, the guide bar 842 and particularly the distal end 844 of the guide bar 842 contacts the protrusion 830 of the jaw set 810. Such engagement of the jaw set 810 with the press tool and resulting contact between the protrusion 830 and the guide bar 842, displaces the ring 850 thereby actuating the microswitch 860. The actuation of the switch 860 is utilized as a control signal for the press tool and can be used to govern operation of the press tool motor.

Figure 15:
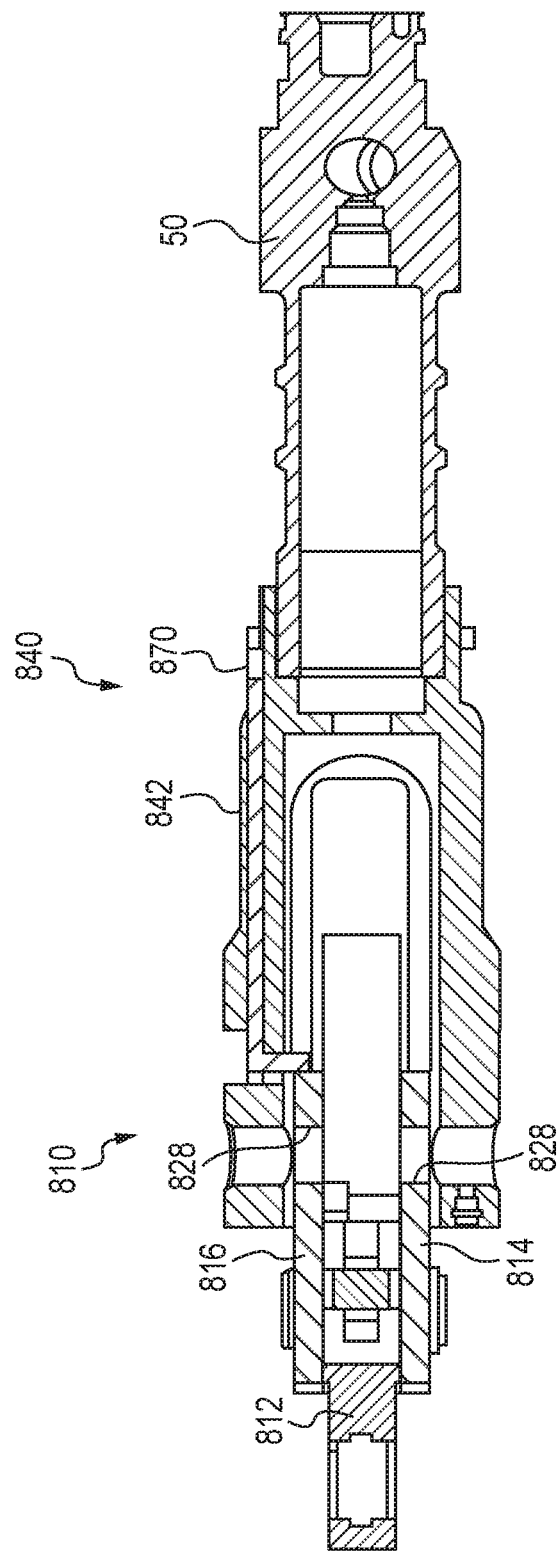
FIGS. 15 and 16 illustrate the jaws of FIGS. 13 and 14 engaged with a press tool having the noted sensing assembly.
Figure 16:
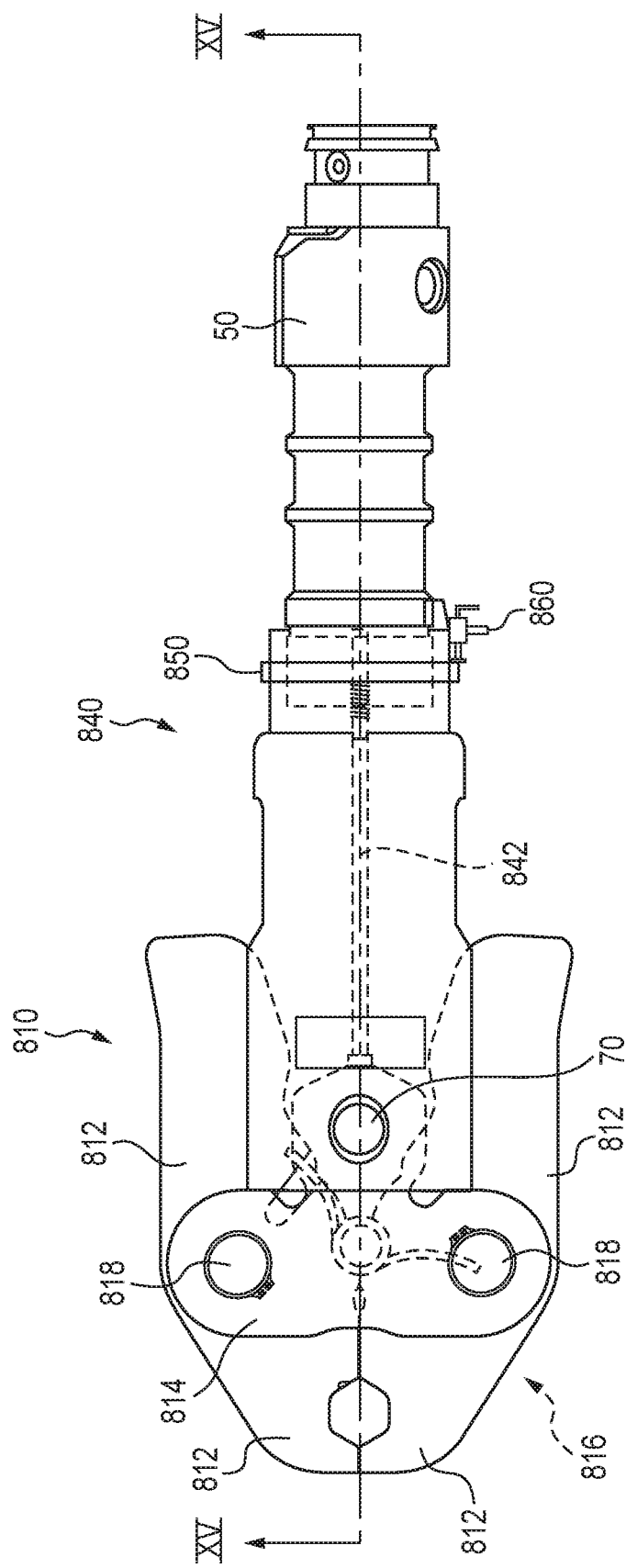

FIGS. 15 and 16 illustrate engagement of the jaw set 810 with the working end or nose of the press tool 50. Specifically, FIG. 16 is a schematic elevation view of the jaw set 810 and the noted portion of the press tool 50. FIG. 15 is a schematic cross-section of the assembly depicted in FIG. 16. FIGS. 15 and 16 further illustrate the sensing assembly 840 and related components such as the guide bar, 842, the spring 870, the ring 850, and the switch 860.

The present subject matter includes a wide array of sensing assemblies and is not limited to the particular sensing assembly 840 described herein. The sensing assembly can include additional components and/or utilize components different than the guide bar 842 and/or the ring 850, for example. Furthermore, sensors besides or different than the microswitch 860 could be used.

Figure 17:
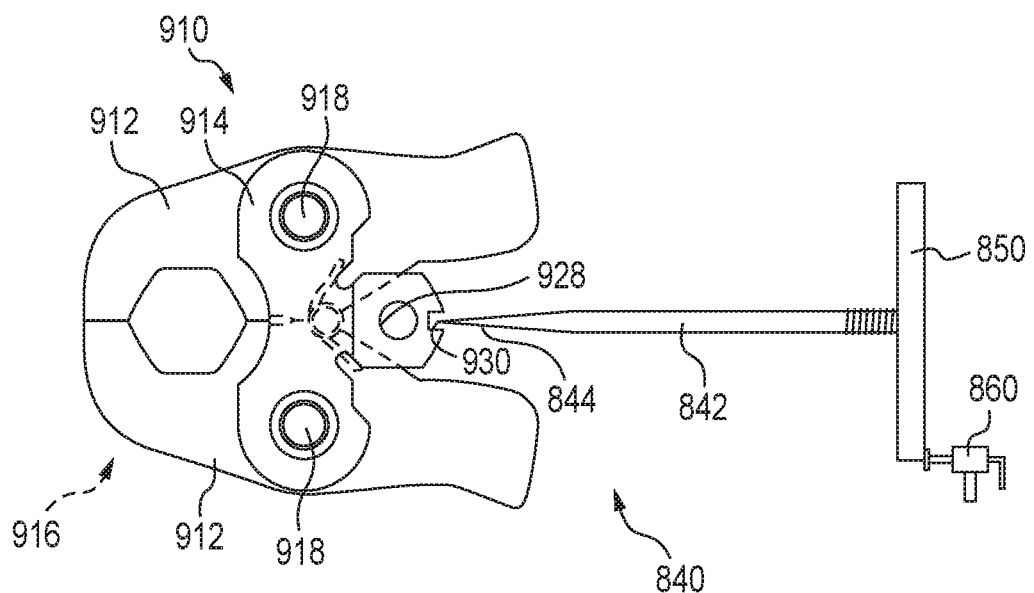
FIG. 17 illustrates another embodiment of jaws in conjunction with an embodiment of a sensing assembly in accordance with the present subject matter.

FIG. 17 illustrates another embodiment of jaws 910 in association with the sensing assembly 840. The jaws 910 include a side plate having a physical feature in the form of a recess such as recess 930. In the referenced figures, the recess 930 is rearwardly accessible, i.e., from a direction of a press tool upon engagement of the jaws 910 therewith. The jaw set 910 comprises two opposing jaw arms 912, each with a press profile on one end and typically two cam profiles on the opposing end. The two jaw arms 912 are held or retained by two side plate pins 918 between two T-shaped side plates 914, 916. The T-shaped side plates 914, 916 define holes 928 through which a jaw pin such as previously described jaw pin 70, connects the press jaw assembly 910 with the press tool. By pulling and withdrawing the jaw pin 70 from the holes 928, the press jaw 910 can be removed from the press tool. Additional features of the jaw assembly 910 are as previously described in association with the jaw assembly 10.

In this embodiment, at least one of the side plates 914, 916 includes a physical feature that is sensed or otherwise recognized by the press tool or related components, to thereby communicate information to the press tool, such information typically regarding the jaws 910 such as their size, capacity, and/or configuration. The information is utilized to control and/or govern operation of the press tool for example its motor. In the embodiment of FIG. 17, the physical feature is in the form of a recess 930.

As will be understood with further reference to FIG. 17, upon engagement of the jaws 910 to a press tool including the sensing assembly 840, the distal end 844 of the guide bar 842 is received and engaged within the recess 930 of the jaws 910. The sensing assembly 840 is configured to distinguish or recognize a difference in force applied to the switch 860 resulting from the guide bar 842 contacting the protrusion 830 of the jaws 810, or the recess 930 of the jaws 910. For example, a first set of jaws having a typical or conventional side plate may upon engagement in a press tool with the sensing assembly 840, produce a particular force on the switch 860. A second, larger set of jaws if equipped with the previously described protrusion 830 may produce a higher force on the switch 860. And, another set of jaws, i.e., a third set, smaller than the first set of jaws, having the previously described recess 930 may produce a lesser force on the switch 860. The different forces applied to the switch 860 enable the sensing assembly 840 and/or electronics associated therewith, to identify a particular jaw set or characteristics thereof.

The present subject matter includes a wide array of jaw sets and geometries and configurations for conveying information or characteristics of the jaw set to the sensing assembly and/or electronics of a press tool. For example the jaw sets can utilize multiple protrusions and/or recesses or concave regions. The protrusions, recesses, and/or concave regions can be of different shapes and/or sizes. In such versions, the switch of the sensing assembly can include multiple switches or sensors to divide a range of potential jaw sets into multiple groups. In such versions, the press tool utilizing such a sensing assembly can be configured to generate different and/or multiple forces.

Figure 18:
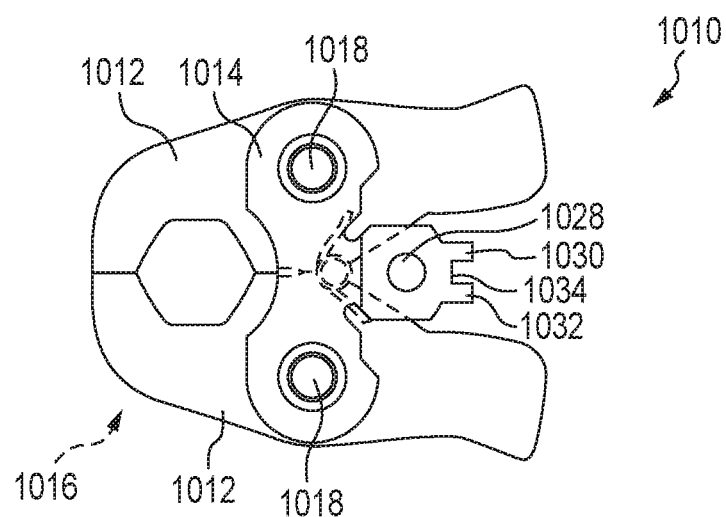
FIG. 18 illustrates another embodiment of jaws in accordance with the present subject matter.

FIG. 18 illustrates another jaw set 1010 in accordance with the present subject matter. The jaw set 1010 comprises two opposing jaw arms 1012, each with a press profile on one end and typically two cam profiles on the opposing end. The two jaw arms 1012 are held or retained by two side plate pins 1018 between two T-shaped side plates 1014, 1016. The T-shaped side plates 1014, 1016 define holes 1028 through which a jaw pin such as previously described jaw pin 70, connects the press jaw assembly 1010 with the press tool. By pulling and withdrawing the jaw pin 70 from the holes 1028, the press jaw 1010 can be removed from the press tool. Additional features of the jaw assembly 1010 are as previously described in association with the jaw assembly 10.

In this embodiment, at least one of the side plates 1014, 1016 includes a plurality of physical features that are sensed or otherwise recognized by the press tool or related components, to thereby communicate information to the press tool, such information typically regarding the jaws 1010 such as their size, capacity, and/or configuration. The information is utilized to control and/or govern operation of the press tool for example its motor. In the embodiment of FIG. 18, the physical feature is in the form of a first protrusion 1030, a second protrusion 1032, and a recess 1034 defined between the first and second protrusions 1030, 1032. In the referenced figure, the protrusions 1030, 1032 extend rearwardly, i.e., toward a press tool upon engagement of the jaws 1010 therewith. And, the recess 1034 is rearwardly accessible as previously described.

A wide array of sensor(s) can be used instead of, or in addition to, the switch 860 of the sensing assembly 840 or variant versions thereof. For example, a position sensor can be used to determine with or without objective. For example, position sensor objectives could include, but are not limited to, identifying a start position of a press, identifying a final position of a press, and/or identifying a cam location with increased stress levels. One or more strain gauge sensors could be used to determine or measure strain experienced by a jaw arm and convert the measurement or assessment into one or more output signals. Furthermore, a position sensor can sense the position of a measured object and convert it into a sensor that can output signals. For example, the position sensor has two types: contact type and proximity type. Regarding contact sensors, the contact of the contact sensor is actuated by contact between two objects, such as travel switches and two-dimensional matrix position sensors. A proximity sensor or switch refers to a switch that can send out an "action" signal when an object is close to a set distance, without direct contact with the object. There are many types of proximity switches, mainly electromagnetic, photoelectric, differential transformer, eddy current, capacitive, reed switch, Hall type, etc. A light electrical sensor switch could be used. A distance sensor could be used. A distance sensor can assess the distance from a jaw set to the sensor. The distance sensor can use laser technology, ultrasonic technology, infrared technology, and/or Hall Effect magnetic field technology. Suitable sensors are available from numerous commercial suppliers such as but not limited to those from Baumer Ltd., of Southington, Connecticut, USA.

Figure 19:
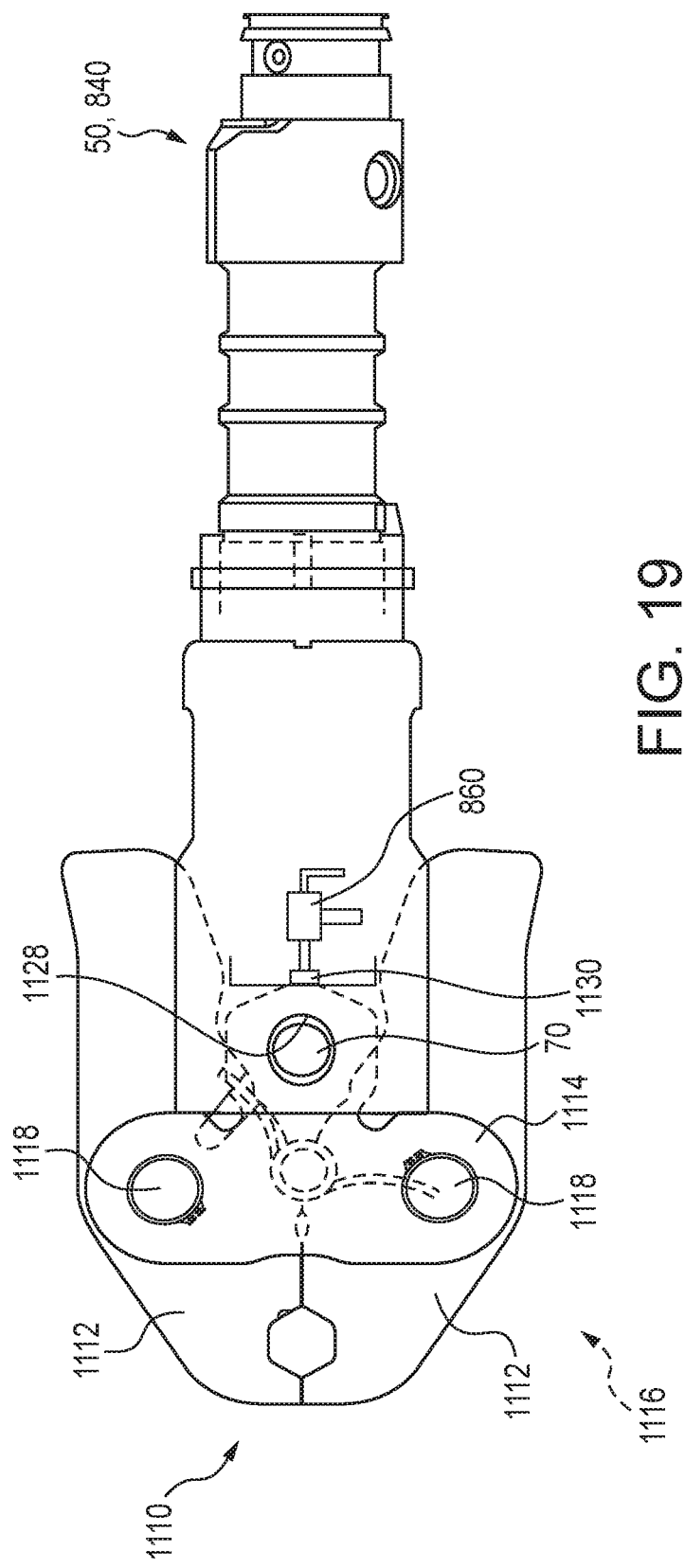
FIG. 19 illustrates another embodiment of jaws shown in engagement with a portion of a press tool in accordance with the present subject matter.

The switch(es) and/or sensor(s) of the sensing assembly can be incorporated and/or located in a variety of different locations in a press tool. FIG. 19 illustrates another embodiment of jaws 1110 engaged with a press tool 50. The jaw set 1110 comprises two opposing jaw arms 1112, each with a press profile on one end and typically two cam profiles on the opposing end. The two jaw arms 1112 are held or retained by two side plate pins 1118 between two T-shaped side plates 1114, 1116. The T-shaped side plates 1114, 1116 define holes 1128 through which a jaw pin such as previously described jaw pin 70, connects the press jaw assembly 1110 with the press tool. By pulling and withdrawing the jaw pin 70 from the holes 1128, the press jaw 1110 can be removed from the press tool 50. Additional features of the jaw assembly 1110 are as previously described in association with the jaw assembly 10.

The press tool 50 includes a sensing assembly 840 having a switch 860. The switch 860 is located within a cylinder head area of the press tool 50 so as to be relatively close to a side plate 1114 of the jaw set 1110. A protrusion 1130 of the side plate 1114 is utilized to directly contact the switch 860 and actuate the switch. This arrangement eliminates other components of the sensing assembly 840 such as the guide bar 842, the ring 850, and the spring 870.

Figure 20:
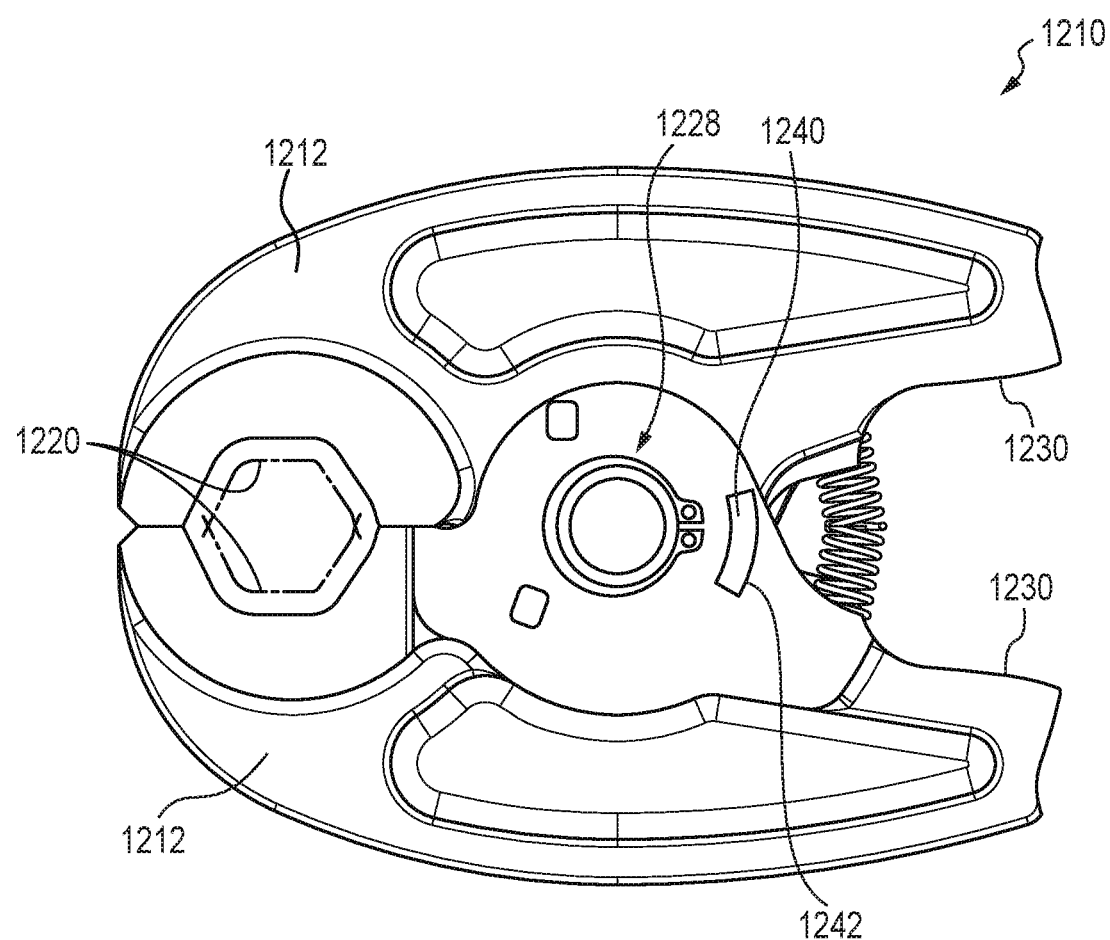
FIGS. 20 and 21 illustrate another embodiment of jaws in accordance with the present subject matter.
Figure 21:
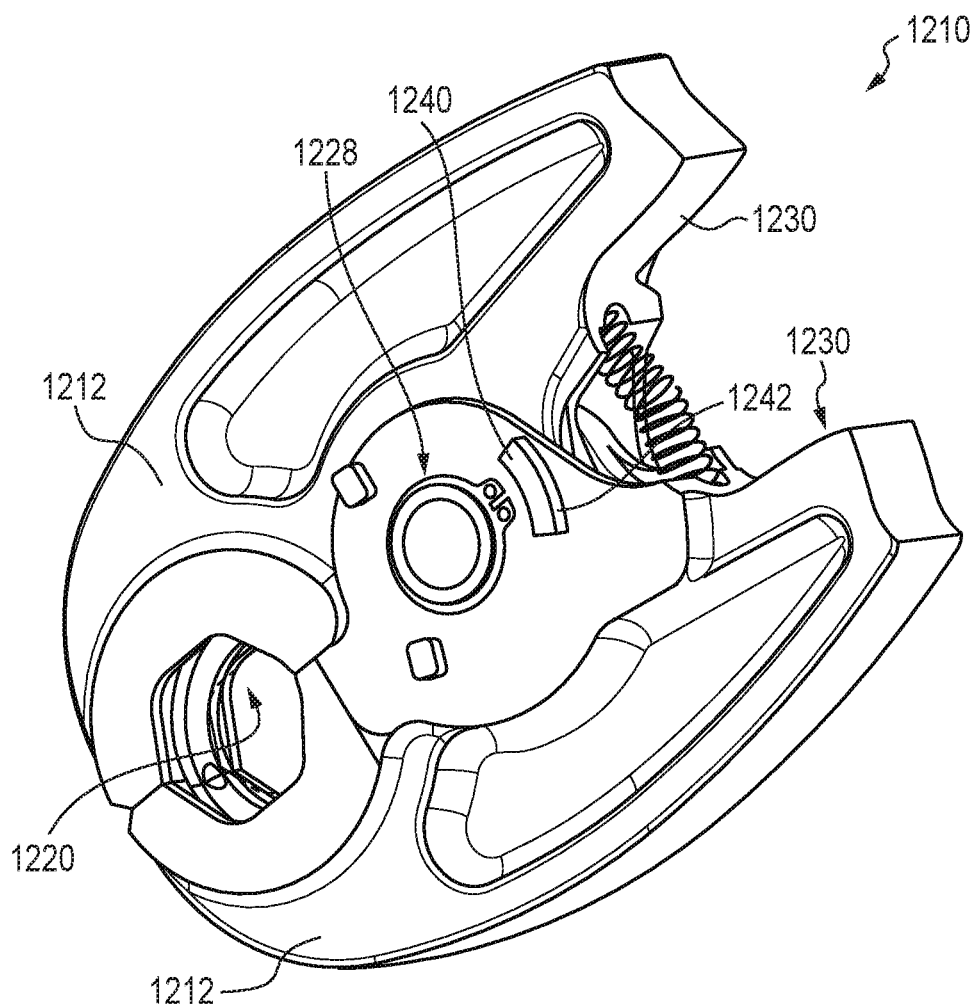

The present subject matter also includes sensing assemblies used in association with jaws and jaw sets that are free of side plates. For example, instead of utilizing one or more physical features in a side plate, one or both jaws can include particular physical feature(s) that are used by a sensing assembly incorporated in a press tool to convey information regarding the jaws or jaw set. FIGS. 20 and 21 illustrate an embodiment of jaws 1210 used in a press tool as described herein. The jaws 1210 are free of side plates. The jaws 1210 comprise two opposing jaw arms 1212, each with a press profile on one end and typically two cam profiles on the opposing end. The press profile is depicted as 1220. The cam profiles are shown as 1230. The jaw arms 1212 each define holes 1228 through which a jaw pin such as previously described jaw pin 70, connects the jaw assembly 1210 with the press tool.

In this embodiment, at least one of the jaw arms 1212 includes a physical feature that is sensed or otherwise recognized by the press tool or related components, to thereby communicate information to the press tool, such information typically regarding the jaws 1210 such as their size, capacity, and/or configuration. The information is utilized to control and/or govern operation of the press tool for example its motor. In the embodiment of FIGS. 20-21, the physical feature is in the form of a boss 1240. In the referenced figures, the boss 1240 extends laterally outward from a face or side surface of a jaw arm 1212.

In the particular embodiment described herein and depicted in FIGS. 20 and 21, the boss 1240 is in the form of a circular or arcuate rib. The configuration, shape, degree of curvature, height, and/or location of the boss on a jaw arm could be utilized to convey information to the sensing assembly. Typically, the sensing assembly would employ the same or similar assembly as the previously described sensing assembly 840. Upon engagement of the jaws 1210 in a press tool, contact would occur between the boss 1240 and the distal end 844 of the guide bar 842, see FIG. 17. In many versions, the contact occurs between the distal end 844 of the guide bar 842 or a microswitch 860 as shown in FIG. 19, and a rearwardly directed face 1242 of the boss 1240. It will be understood that the boss 1240 and/or its face 1242 may constitute the physical feature that conveys information to the sensing assembly. The present subject matter also includes versions of jaw assemblies or jaw sets that are free of side plates in which the physical feature is in the form of a protrusion such as a rearwardly extending protrusion, a recess, and combinations thereof. The recess may be rearwardly accessible.

An alternative provided by the present subject matter is a tool that detects a full jaw closure and then terminates the press cycle once full jaw closure is detected. While such a tool could help extend the jaw life or reduce the jaw weight, the tool cannot keep track of the usage history of individual jaws, as data about a specific jaw cannot be collected.

The press tool according to the present subject matter can include a number of alternatives as follows. The pressing tool may include a pressure sensor. The pressing tool may include electronic circuitry, controller(s), memory, and related components to record and/or store information regarding different size fittings and a hydraulic pressure requirement data matrix. The pressing tool may include an electric magnetic switch to release the hydraulic valve. The jaws can include a unique feature on one part, for example a side plate to indicate a particular size or configuration. The unique feature on the side plate can trigger a signal to the pressing tool, for example, by activating or closing the multiple micro switches. The signal from the switches or sensors can communicate with the electronic circuitry, controller(s), memory, and related components to notify the magnetic switch to release the hydraulic valve when reaching a required hydraulic pressure, for example 40 Mpa, which equals the required force, for example 24 kN. Various jaws can be categorized into particular groups for example, below 1¼ inch jaws which require 24 kN, and from 1 inch to 2 inch jaws which require 32 kN. The pressing tool default force can be relatively high force for example 32 kN (53 Mpa). The pressing tool may include a pressure sensor. The pressing tool may include an electromagnetic switch to release the hydraulic pressure valve. The jaws below 1¼ inch may include a unique feature, for example a special tab or red area, on the side plate and when mounted on the tool, the special tab can push the micro limit switch on the tool MCU to release the valve when reaching the lower hydraulic pressure, for example 40 Mpa (24 kN).

The tool and jaws provide various advantages and benefits as follows. The jaws can be divided or categorized into a plurality of groups such as two or three groups, for example below 1¼ inch jaws which require 24 kN, and from 1 inch to 2 inch jaws which require 32 kN. The pressing tool default force is a relatively high force for example 32 kN (53 Mpa). The pressing tool may include a pressure sensor. The pressing tool may include an electric magnetic switch to release the hydraulic pressure valve. The jaws below 1¼ inch may utilize a unique feature, for example a special tab or red area on the side plate and when mounted it on the tool, the special tab can push the micro limit switch on the tool electronic circuitry, controller(s), memory, and related components to release the valve when reaching the lower hydraulic pressure, for example 40 Mpa (24 kN).

The present subject matter system includes one or more tools having electronic data storage provisions such as the memory 82, electronic control circuitry such as the controller 80, and communication provisions such as the provisions 84 and/or the interconnectivity provisions 85. Typically, the tools are electrically powered or at least include electrical controls. In many embodiments, the tools are hand-held tools however the present subject matter includes other tools or tool systems such as stationary or non-mobile tool systems such as floor standing equipment or transportable or bench top tools. One or multiple tools can be utilized with the cloud server and the mobile devices. Nonlimiting examples of tools include press tools, crimping tools, inspection or remote viewing systems, locating equipment, rotary powered tools including drills, grinders, impact tools, powered wrenches, expansion tools, shaping or forming tools, table saws, circular saws, miter saws, and the like. A wide array of tools are encompassed by the present subject matter. And, although jaws, jaw sets, or jaw assemblies are noted as examples of a tool accessory, it will be understood that the present subject matter is not limited to jaws, but includes a wide array of other tool accessories.

Electronic data-storage provisions, typically incorporated into a tool, can be in the form of known data storage formats including flash-memory components. The data-storage provisions may also include or be in the form of memory cards, disk or drive components, data cartridges or components such as ROM or RAM memory, and peripheral data storage components. The electronic control circuitry includes one or more electronic processors configured to implement and execute the systems and methods described herein. The communication provisions are typically selected in view of the communication provisions of the mobile device(s). Various communication formats can be used for the tool including but not limited to radio frequency, infrared, BLUETOOTH, Wi-Fi, near-field communications, and cable-based communications. The previously noted communication protocols can be used for tool communication.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method of managing a system of at least one power tool and at least one tool accessory, the method comprising:
   providing a controller disposed within the at least one power tool to:
   count use cycles of the at least one power tool to provide a first cumulative total;
   identify the at least one tool accessory attached to the at least one power tool;
   count use cycles of the at least one tool accessory to provide a second cumulative total, wherein the use cycles of the at least one tool accessory are counted based on the identification of the at least one tool accessory;
   compare the first cumulative total to a tool use warning value;

compare the second cumulative total to a tool accessory warning value; and generate a warning signal when at least one of the first cumulative total is greater than the tool use warning value, and the second cumulative total is greater than the tool accessory warning value.

2. The method of claim 1 wherein the at least one power tool comprises:

interconnectivity provisions for communicating with at least one electronic mobile devices.

3. The method of claim 1 wherein the at least one power tool comprises:

interconnectivity provisions for communicating with a cloud-based server.

4. The method of claim 1 wherein the at least one power tool comprises communication provisions configured to receive information from an RFID chip to identify the at least one tool accessory.

5. The method of claim 1 wherein the at least one power tool comprises communication provisions configured to receive information from an NFC chip to identify the at least one tool accessory.

6. The method of claim 1 wherein the at least one power tool is a press tool.

7. The method of claim 1 further comprising:

storing the second cumulative total on a memory of at least one of a cloud server, a mobile device, a computer, and the at least one power tool.

8. The method of claim 3 wherein the cloud-based server stores the number of use cycles of the at least one power tool.

9. The method of claim 3 wherein the cloud-based server stores the number of use cycles of the at least one tool accessory.

10. The method of claim 6 wherein the press tool comprises:

a motor actuated by a displaceable trigger;

a hydraulic circuit including a pump, a reservoir, a hydraulic cylinder, and a piston movably disposed in the cylinder, wherein upon actuation of the motor, the pump is operated to thereby move the piston relative to the cylinder;

a displaceable ram assembly in operable engagement with the piston;

engagement provisions for releasably engaging a jaw assembly with the press tool;

communication provisions for receiving information associated with a jaw assembly to be used with the press tool.

11. The method of claim 8 wherein the cloud-based server maintains a usage history of the at least one power tool.

12. The method of claim 9 wherein the cloud-based server maintains a usage history of the at least one accessory.

13. The method of claim 10 wherein the press tool further comprises:

a magnetic switch configured to sense a position of the ram assembly.

14. The method of claim 13 wherein the press tool further comprises:

a hydraulic valve located in the hydraulic circuit of the press tool, wherein the hydraulic valve is positionable between an open stat and a closed state based upon the output state of the magnetic switch.

15. A system including a power tool and at least one tool accessory, the system comprising:

a memory disposed in the power tool;

a controller disposed in the power tool for controlling operation of the power tool, the controller configured to:

count use cycles of the power tool to provide a first cumulative total;

identify the at least one tool accessory attached to the power tool;

count use cycles of the at least one tool accessory to provide a second cumulative total, wherein the use cycles of the at least one tool accessory are counted based on the identification of the at least one tool accessory;

compare the first cumulative total with a power tool use warning threshold;

compare the second cumulative total with a tool accessory use warning threshold; and generate a warning signal when one of the first cumulative total exceeds the power tool use warning threshold and the second cumulative total exceeds the power tool accessory use warning threshold.

16. The system of claim 15 wherein the power tool further comprises communication provisions configured to receive identification information from one of an RFID chip and an NFC chip on the at least one tool accessory.

17. The system of claim 15 wherein the power tool is a press tool.

18. The system of claim 15 wherein the at least one tool accessory includes a jaw assembly configured for use with a press tool.

19. The system of claim 17 wherein the press tool comprises:

a motor actuated by a displaceable trigger;

a hydraulic circuit including a pump, a reservoir, a hydraulic cylinder, and a piston movably disposed in the cylinder, wherein upon actuation of the motor, the pump is operated to thereby move the piston relative to the cylinder;

a displaceable ram assembly in operable engagement with the piston;

engagement provisions for releasably engaging a jaw assembly with the press tool;

communication provisions for receiving information associated with a jaw assembly to be used with the press tool.

20. The system of claim 18 wherein the jaw assembly includes:

a first jaw arm member;

a second jaw arm member;

wherein each of the first and the second jaw arm members define a front end and a rear end, and inwardly facing cam surfaces at the rear ends;

a pair of side plates between which the first and the second jaw arm members are pivotally retained; and an electronic chip incorporated into the jaw assembly for identifying and/or providing information relating to the jaw assembly.

21. The system of claim 18 wherein the jaw assembly includes:

a first jaw arm member;

a second jaw arm member;

wherein each of the first and the second jaw arm members define a front end and a rear end, and inwardly facing cam surfaces at the rear ends;

a pair of side plates between which the first and the second jaw arm members are pivotally retained;

wherein at least one of the side plates includes a physical feature for providing information concerning the jaw assembly.

22. The system of claim 18 wherein the jaw assembly includes:

a first jaw arm member;

a second jaw arm member;

wherein each of the first and the second jaw arm members define a front end and a rear end, and inwardly facing cam surfaces at the rear ends;

wherein at least one of the first jaw arm member and the second jaw arm member includes a physical feature for providing information concerning the jaw assembly.

23. The system of claim 19 wherein the press tool further comprises:

a magnetic switch configured to sense a position of the ram assembly.

24. The system of claim 20, wherein the chip is one of a RFID chip and an NFC chip.

25. The system of claim 21 wherein the physical feature is selected form the group consisting of a protrusion, a recess, and combinations thereof.

26. The system of claim 22 wherein the physical feature is selected from the group consisting of a boss, a protrusion, a recess, and combinations thereof.

27. The system of claim 25 wherein the physical feature is a protrusion and the protrusion extends rearwardly.

28. The system of claim 23 wherein the press tool further comprises:

a hydraulic valve located in the hydraulic circuit of the press tool, wherein the hydraulic valve is positionable between an open state and a closed state based upon the output state of the magnetic switch.

29. The system of claim 26 wherein the physical feature is a boss and the boss extends laterally outward from a jaw arm member.

30. The system of claim 25 wherein the physical feature is a recess and the recess is rearwardly accessible.

31. The system of claim 22 wherein the jaw assembly is free of side plates.

\* \* \* \* \*